(12) United States Patent
Rachniowski et al.

(10) Patent No.: US 12,259,857 B2
(45) Date of Patent: *Mar. 25, 2025

(54) RULE-BASED SYSTEMS AND METHODS FOR CUSTOMIZING COMPLEX BUSINESS SOLUTIONS

(71) Applicant: Kinaxis Inc., Ottawa (CA)

(72) Inventors: Zbigniew Paul Rachniowski, Ottawa (CA); Steve McStravick, Ottawa (CA); Eduardo Rivero, Ottawa (CA); Andrei Anisenia, Ottawa (CA); Fekadeab Dejene, Ottawa (CA)

(73) Assignee: Kinaxis Inc., Ottawa (CA)

( * ) Notice: Subject to any disclaimer, the term of this patent is extended or adjusted under 35 U.S.C. 154(b) by 333 days.

This patent is subject to a terminal disclaimer.

(21) Appl. No.: 17/480,419

(22) Filed: Sep. 21, 2021

(65) Prior Publication Data
US 2022/0180263 A1   Jun. 9, 2022

Related U.S. Application Data

(60) Provisional application No. 63/121,368, filed on Dec. 4, 2020.

(51) Int. Cl.
*G06F 16/21* (2019.01)
*G06F 16/23* (2019.01)
(Continued)

(52) U.S. Cl.
CPC .......... *G06F 16/213* (2019.01); *G06F 16/211* (2019.01); *G06F 16/2358* (2019.01);
(Continued)

(58) Field of Classification Search
CPC .............. G06Q 10/0637; G06Q 10/103; G06F 16/211; G06F 40/186; G06F 16/2358;
(Continued)

(56) References Cited

U.S. PATENT DOCUMENTS

| 6,256,773 B1 | 7/2001 | Bowman-Amuah |
| 6,393,437 B1 | 5/2002 | Zinda et al. |

(Continued)

FOREIGN PATENT DOCUMENTS

| AU | 2014268241 A1 | 5/2015 |
| CA | 3112132 A1 | 6/2020 |

(Continued)

OTHER PUBLICATIONS

Curino, C., Moon, H.J., Deutsch, A. et al. Automating the database schema evolution process. The VLDB Journal 22, 73-98 (2013), https://doi.org/10.1007/s00778-012-0302-x (Year: 2013).*

(Continued)

*Primary Examiner* — Charles Guiliano
*Assistant Examiner* — Letoria G Knight
(74) *Attorney, Agent, or Firm* — Borden Ladner Gervais

(57) ABSTRACT

Systems and method than generate an effective recipe file by selecting at least one of a functionality, a feature and a configuration option from a master recipe database, the selecting based on a business objective; and generating a customized resource by applying the effective recipe file to a first working copy of a resource selected from a master copy of resources.

15 Claims, 16 Drawing Sheets

(51) Int. Cl.
  *G06N 5/01* (2023.01)
  *G06Q 10/0637* (2023.01)
  *G06Q 10/10* (2023.01)
  *G06Q 10/101* (2023.01)

(52) U.S. Cl.
  CPC ........... *G06N 5/01* (2023.01); *G06Q 10/0637* (2013.01); *G06F 16/2379* (2019.01); *G06Q 10/101* (2013.01); *G06Q 10/103* (2013.01)

(58) Field of Classification Search
  CPC ...... G06F 8/71; G06F 40/197; G06F 11/0751; G06F 11/3624; G06F 16/213
  USPC ........................................................ 705/7.36
  See application file for complete search history.

(56) References Cited

U.S. PATENT DOCUMENTS

| | | | |
|---|---|---|---|
| 7,139,999 B2 | 11/2006 | Bowman-Amuah | |
| 7,614,040 B2 | 11/2009 | Wagner et al. | |
| 8,156,213 B1* | 4/2012 | Deng | H04L 41/084 709/224 |
| 8,352,870 B2* | 1/2013 | Bailor | G06F 16/954 715/230 |
| 8,489,982 B2 | 7/2013 | Davis | |
| 9,292,306 B2 | 3/2016 | Day et al. | |
| 9,348,581 B2 | 5/2016 | Farah et al. | |
| 9,352,870 B2* | 5/2016 | Muse | B65F 1/1415 |
| 9,401,846 B2* | 7/2016 | Abels | H04L 41/0853 |
| 9,811,394 B1 | 11/2017 | Kogias | H04L 67/34 |
| 10,262,030 B1* | 4/2019 | Burtenshaw | G06F 16/289 |
| 10,997,556 B2* | 5/2021 | Scott | G06Q 10/103 |
| 2004/0172425 A1 | 9/2004 | Edelstein et al. | |
| 2004/0186817 A1* | 9/2004 | Thames | G06F 8/73 |
| 2005/0193269 A1* | 9/2005 | Haswell | G06F 11/3684 714/E11.208 |
| 2007/0011211 A1 | 1/2007 | Reeves et al. | |
| 2007/0244775 A1* | 10/2007 | Linder | G06Q 40/00 705/35 |
| 2008/0086683 A1 | 4/2008 | Rich et al. | |
| 2008/0162509 A1 | 7/2008 | Becker | |
| 2008/0288448 A1 | 11/2008 | Agredano et al. | |
| 2009/0006933 A1 | 1/2009 | Gavrilov et al. | |
| 2009/0083314 A1* | 3/2009 | Maim | G06F 40/194 |
| 2011/0153685 A1 | 6/2011 | Butine | |
| 2011/0208700 A1* | 8/2011 | Noble | G06F 16/27 707/638 |
| 2013/0332241 A1 | 12/2013 | Taylor | |
| 2014/0013205 A1 | 1/2014 | Mikhaiel et al. | |
| 2014/0040714 A1* | 2/2014 | Siegel | G06F 40/103 715/203 |
| 2014/0281872 A1 | 9/2014 | Glover et al. | |
| 2015/0142726 A1 | 5/2015 | Taylor | |
| 2015/0379430 A1* | 12/2015 | Dirac | G06N 20/00 706/12 |
| 2016/0004973 A1 | 1/2016 | Trenkov et al. | |
| 2018/0367506 A1 | 12/2018 | Ford et al. | |
| 2019/0026255 A1 | 1/2019 | Rix et al. | |
| 2019/0026320 A1* | 1/2019 | Sharma | G06F 16/212 |
| 2019/0146656 A1* | 5/2019 | Raffo | G06F 9/44505 715/713 |
| 2019/0155894 A1* | 5/2019 | Gandhi | G06F 40/186 |
| 2019/0244149 A1 | 8/2019 | Krishnaswamy | |
| 2020/0167463 A1 | 5/2020 | Adams et al. | |
| 2020/0174907 A1* | 6/2020 | Lundquist | G06F 8/71 |
| 2020/0342005 A1 | 10/2020 | Kreutzer et al. | |
| 2021/0192412 A1 | 6/2021 | Krishnaswamy | |
| 2021/0382709 A1* | 12/2021 | Sagal | G06F 8/71 |
| 2021/0382814 A1* | 12/2021 | Moondhra | G06F 21/57 |
| 2021/0406771 A1 | 12/2021 | Basak | |
| 2023/0409623 A1 | 12/2023 | Roman et al. | |

FOREIGN PATENT DOCUMENTS

| | | |
|---|---|---|
| CN | 110770735 A | 2/2020 |
| WO | 2008015395 A2 | 2/2008 |
| WO | 2012119250 A1 | 9/2012 |
| WO | 2021050875 A1 | 3/2021 |

OTHER PUBLICATIONS

Canadian Patent Application No. 3170691 Office Action dated Jul. 12, 2023.
International Patent Application No. PCT/CA2021/051725, International Preliminary Report on Patentability dated Jun. 15, 2023.
U.S. Appl. No. 17/480,415, Final office action dated Jun. 7, 2023.
International Search Report for PCT/CA2021/051725 mailed Jan. 31, 2022, 7 pages.
Canadian Patent Application No. 3170691 Office Action dated Jan. 12, 2023.
U.S. Appl. No. 17/480,412, Non-Final office action dated Jan. 26, 2023.
U.S. Appl. No. 17/480,415, Non-Final office action dated Jan. 24, 2023.
U.S. Appl. No. 17/541,319, Non-Final office Action dated Feb. 13, 2025.
U.S. Appl. No. 17/480,415, Non-Final office action dated Mar. 29, 2024.
U.S. Appl. No. 17/480,415, Final office action dated Nov. 6, 2024.

* cited by examiner

Examples of Operations

Complex Operations

| | |
|---|---|
| SwapComponent | You have to maintain more than one copy, but swapping a component can change calculations in a more complex way |
| SwapLibraryWorkbook | Maintain two library workbooks instead of two sets of resources |
| SearchReplaceExpression | Modify columns or filter expression |
| SwapDependentResource | Ex. Change drill target |

Packaging Operations

| |
|---|
| AddResource |
| RenameResource |
| AddNamespace |
| AddMacro |
| AddProfileVariable |

Refactoring Operations

| |
|---|
| RenameColumn |
| RenameColumnID |
| RenameWorksheet |
| RenameWorksheetID |
| RenameWorkbook |
| RenameTable |
| RenameField |

General Purpose Operations

| |
|---|
| SetWorkbookProperty |
| SetWorksheetProperty |
| SetColumnProperty |
| SwapDependentResource |

Basic Operations

| |
|---|
| DeleteColumn |
| DeleteWorksheet |
| DeleteVariable |
| DeleteExpressionSection |
| DeleteComponent |
| DeleteCommand |
| DeleteDrillToDetail |
| HideColumn |
| HideWorksheet |
| ColumnEditable |

Data Model Operations

| |
|---|
| RenameTable |
| RenameField |
| DeleteTable |
| DeleteField |
| CopyTable |

FIG. 2

SCHEMA AWARE COMPARE 902

FIG. 12

RULE-BASED SYSTEMS AND METHODS FOR CUSTOMIZING COMPLEX BUSINESS SOLUTIONS

CROSS-REFERENCE TO RELATED APPLICATIONS

The present application claims the benefit of U.S. Patent Application No. 63/121,368, filed Dec. 4, 2020, and is expressly incorporated by reference in its entirety herein.

BACKGROUND

Business solutions that target multiple industries and planning systems are extremely difficult and expensive to create, customize, and maintain. A common practice is to create a set of building blocks and assemble them to create a solution customized for a given customer. However, this process is largely manual. The building blocks typically cover a fraction of the required functionality, thereby leaving many functionality gaps, and require significant integration effort to complete the solution. As an example, when assembling worksheets together, expressions are often edited, or complex rules are often modified. These types of customization activities have to be performed manually and they constitute a large percentage of solution development cost. Overall, the approach of assembling complex business solutions from building blocks is not effective as it eliminates only a small percentage of the manual customization effort and it does not address documentation, training, testing, and maintenance costs of a complete solution.

As an example, supply-chain management requires complex business solutions. The number of business objects or resources can number in the thousands, with each multiplied by the number of different industry templates, core functionality areas having advanced analytics, and added options. Deploying and customizing these applications is a daunting task.

There is a need for low-risk, inexpensive way to manage these resources that saves time and reduces development, documentation, and testing effort. It should be noted throughout this specification that resources are synonymous with business objects.

BRIEF SUMMARY

Disclosed herein are rule-based systems and methods for customizing complex business solutions in a low-risk, inexpensive manner. In some embodiments, a baseline all-encompassing master copy of a resource is created. It is then simplified using a rule-based system that generates a final solution based on declarative rules that express a customer's requirements. The master copy can be fully documented and fully tested, thus greatly reducing the scope of testing, documentation, and training that is required for individual customers.

An advantage of the rule-based systems and methods for customizing complex business solutions is that one complex master copy is much cheaper to maintain and test than a large number of simpler, yet specialized, building blocks or sub-components. Since the master copy has already been tested, there is less effort required to test a stripped-down resource (which is generated from the fully-tested master copy) than to test a brand new resource that is assembled from smaller building blocks.

Traditional tools and methods cannot support very complex business solutions in the low-code, high-configuration category. Disclosed herein is a solution that combines a master copy that covers a superset of all capabilities, a resource generation/management tool, and a 2-way and 3-way schema aware compare.

In one aspect, a computer-implemented method includes generating, by a processor, an effective recipe file by selecting at least one of a functionality, a feature and a configuration option from a master recipe database, the selecting based on a business objective; and generating, by the processor, a customized resource by applying the effective recipe file to a first working copy of a resource selected from a master copy of resources.

In the computer-implemented method, the master recipe database may be generated by annotating, by the processor, a list of modifications in a recipe file, thereby producing an annotated list of modifications; merging, by the processor, the annotated list of modifications into the master recipe database, the master recipe database containing a catalogue of generated modifications; and verifying, by the processor, the master recipe database to ensure there are no conflicts or inconsistencies with respect to other annotated lists of modifications in the master recipe database.

In the computer-implemented method, the recipe file is a compilation of one or more recipe file items, and each recipe file item can be generated by creating, by the processor, a working copy of a first resource selected from the master copy of resources; editing, by the processor, the working copy of the first resource, thereby generating a second resource; testing and validating, by the processor, the second resource; comparing, by the processor, the working copy of the first resource with the second resource; generating, by the processor, a recipe file item from one or more differences between the working copy of the first resource and the second resource, the recipe file item includes an annotated list of commands and/or edits that transform the working copy of the first resource to the second resource; applying, by the processor, the recipe file item to the working copy of the first resource, thereby generating a third resource; comparing, by the processor, the third resource with the second resource; and validating, by the processor, the recipe file item. Comparing between any two resources may be a schema-aware compare. Comparing between any two resources may compare schema metadata of the first resource and the second resource.

In the computer-implemented method, the master copy may be documented and tested; and may include a plurality of functionalities, a plurality of features, and a plurality of configuration options.

In the computer-implemented method, the resources may comprise at least one of workbooks, widgets, task flows, scripts, scorecards, responsibility, process templates, hierarchies, forms, filters, dashboards and alerts. Other technical features may be readily apparent to one skilled in the art from the following figures, descriptions, and claims.

In one aspect, a system includes a processor. The system also includes a memory storing instructions that, when executed by the processor, configure the system to generate, by the processor, an effective recipe file by selecting at least one of a functionality, a feature and a configuration option from a master recipe database, the selecting based on a business objective; and generate, by the processor, a customized resource by applying the effective recipe file to a first working copy of a resource selected from a master copy of resources.

In the system, the master recipe database may be generated by the memory storing instructions that, when executed by the processor, further configure the system to annotate, by the processor, a list of modifications in a recipe file, thereby producing an annotated list of modifications; merge, by the processor, the annotated list of modifications into the master recipe database, the master recipe database containing a catalogue of generated modifications; and verify, by the processor, the master recipe database to ensure there are no conflicts or inconsistencies with respect to other annotated lists of modifications in the master recipe database.

In the system, the recipe file is a compilation of one or more recipe file items, and each recipe file item can be generated by the memory storing instructions that, when executed by the processor, further configure the system to: create, by the processor, a working copy of a first resource selected from the master copy of resources; edit, by the processor, the working copy of the first resource, thereby generating a second resource; test and validate, by the processor, the second resource; compare, by the processor, the working copy of the first resource with the second resource; generate, by the processor, a recipe file item from one or more differences between the working copy of the first resource and the second resource, the recipe file item includes an annotated list of commands and/or edits that transform the working copy of the first resource to the second resource; apply, by the processor, the recipe file item to the working copy of the first resource, thereby generating a third resource; compare, by the processor, the third resource with the second resource; and validate, by the processor, the recipe file item. Comparing between any two resources may be a schema-aware compare. Comparing between any two resources may compare schema metadata of the first resource and the second resource.

In the system, the master copy may be documented and tested; and may include a plurality of functionalities, a plurality of features, and a plurality of configuration options.

In the system, the resources may comprise at least one of workbooks, widgets, task flows, scripts, scorecards, responsibility, process templates, hierarchies, forms, filters, dashboards and alerts. Other technical features may be readily apparent to one skilled in the art from the following figures, descriptions, and claims.

In one aspect, a non-transitory computer-readable storage medium, the computer-readable storage medium including instructions that when executed by a computer, cause the computer to generate, by a processor, an effective recipe file by selecting at least one of a functionality, a feature and a configuration option from a master recipe database, the selecting based on a business objective; and generate, by the processor, a customized resource by applying the effective recipe file to a first working copy of a resource selected from a master copy of resources.

In the computer-readable storage medium, the master recipe database may be generated by the instructions that when executed by the computer, cause the computer to: annotate, by the processor, a list of modifications in a recipe file, thereby producing an annotated list of modifications; merge, by the processor, the annotated list of modifications into the master recipe database, the master recipe database containing a catalogue of generated modifications; and verify, by the processor, the master recipe database to ensure there are no conflicts or inconsistencies with respect to other annotated lists of modifications in the master recipe database.

In the computer-readable storage medium, the recipe file is a compilation of one or more recipe file items, and each recipe file item can be generated by the instructions that when executed by the computer, cause the computer to: create, by the processor, a working copy of a first resource selected from the master copy of resources; edit, by the processor, the working copy of the first resource, thereby generating a second resource; test and validate, by the processor, the second resource; compare, by the processor, the working copy of the first resource with the second resource; generate, by the processor, a recipe file item from one or more differences between the working copy of the first resource and the second resource, the recipe file item includes an annotated list of commands and/or edits that transform the working copy of the first resource to the second resource; apply, by the processor, the recipe file item to the working copy of the first resource, thereby generating a third resource; compare, by the processor, the third resource with the second resource; and validate, by the processor, the recipe file item. Comparing between any two resources may be a schema-aware compare. Comparing between any two resources may compare schema metadata of the first resource and the second resource.

In the computer-readable storage medium, the master copy may be documented and tested; and may include a plurality of functionalities, a plurality of features, and a plurality of configuration options.

In the computer-readable storage medium, the resources may comprise at least one of workbooks, widgets, task flows, scripts, scorecards, responsibility, process templates, hierarchies, forms, filters, dashboards and alerts. Other technical features may be readily apparent to one skilled in the art from the following figures, descriptions, and claims. Other technical features may be readily apparent to one skilled in the art from the following figures, descriptions, and claims.

Disclosed herein is a tool to programmatically edit business objects and other resources. It takes a master copy of resources, and modifies it using a set of conditions and editing rules. The rules are declarative so that no programming is required. In this manner, a master copy of resources that has already been created, is leveraged to address issues of complexity regarding customization of these resources. In some embodiments, that testing has been automated. The tool can provide a low-risk, low-cost approach.

Disclosed herein is a tool that provides the benefit of learning how solutions are built and to codify changes based on the normal course of developing business solutions, followed by as much automation as possible of development tasks, which reduces costs, errors, and deployment time.

Disclosed herein is a 2-way and 3-way compare-merge tool that allows consultants and customers to reconcile the changes that they have made with a generated copy of the resources.

In summary, an effective, easy-to-use comparison tool includes: a schema-aware compare; sophisticated handling of collection properties, especially nested collections; effective matching algorithms to recognize that two items are the same business object in spite of outward differences; an ability to accept user hints and input and persist user decisions; a structured report that reflects the structure of the business object; color formatting, tagging, and filtering to find the important changes among the large volume of differences (among the thousands of changes per resource). Furthermore, adding a common ancestor as a third data point in the 3-way compare identifies the source of changes.

Disclosed herein is a method to use a syntax-aware and language grammar-aware tool to analyze the freeform code contained in the low-code solutions to identify dependencies, sub-expressions, logic branches, and composition of the expressions to permit robust reporting, comparison, and editing of the code. This permits automatic manipulation of code to support a range of actions that can alter the behavior or streamline the code or by removing unnecessary sections.

Disclosed herein is a method to use advanced text matching and parsing algorithms to analyze, compare, and edit freeform text contained in the low-code business solutions. This capability extends the benefit of automated resource generation to the documentation embedded in the resources as help text or freeform notes, or stored in separate documents that accompany the business solution. Documentation and training materials consume a large percentage of the solution development effort.

Disclosed herein is a method for tracking dependencies between test cases and resources that comprise the overall business solution, further reducing the manual effort to deliver the completed business solution. The premise of this capability is that a customized solution is derived from an all-encompassing master copy that has a defined set of tests. Automating creation and management of test plans based on knowledge gained from how the resources were customized reduces effort needed to test the business solution.

Disclosed herein is a method for automating packaging and deployment of the solution based on the knowledge of how the solution was customized. An integral enabling piece is tracking of interdependencies of all resources that comprise the business solution from the process outline, through resource authoring, documentation and training. This permits automated creation of deployable resource package that is ready to install on a customer sever.

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2 illustrates an examples of operations 200 in accordance with one embodiment.

FIG. 12 illustrates an example of a 3-way compare report in accordance with one embodiment.

DETAILED DESCRIPTION

Figure 1:
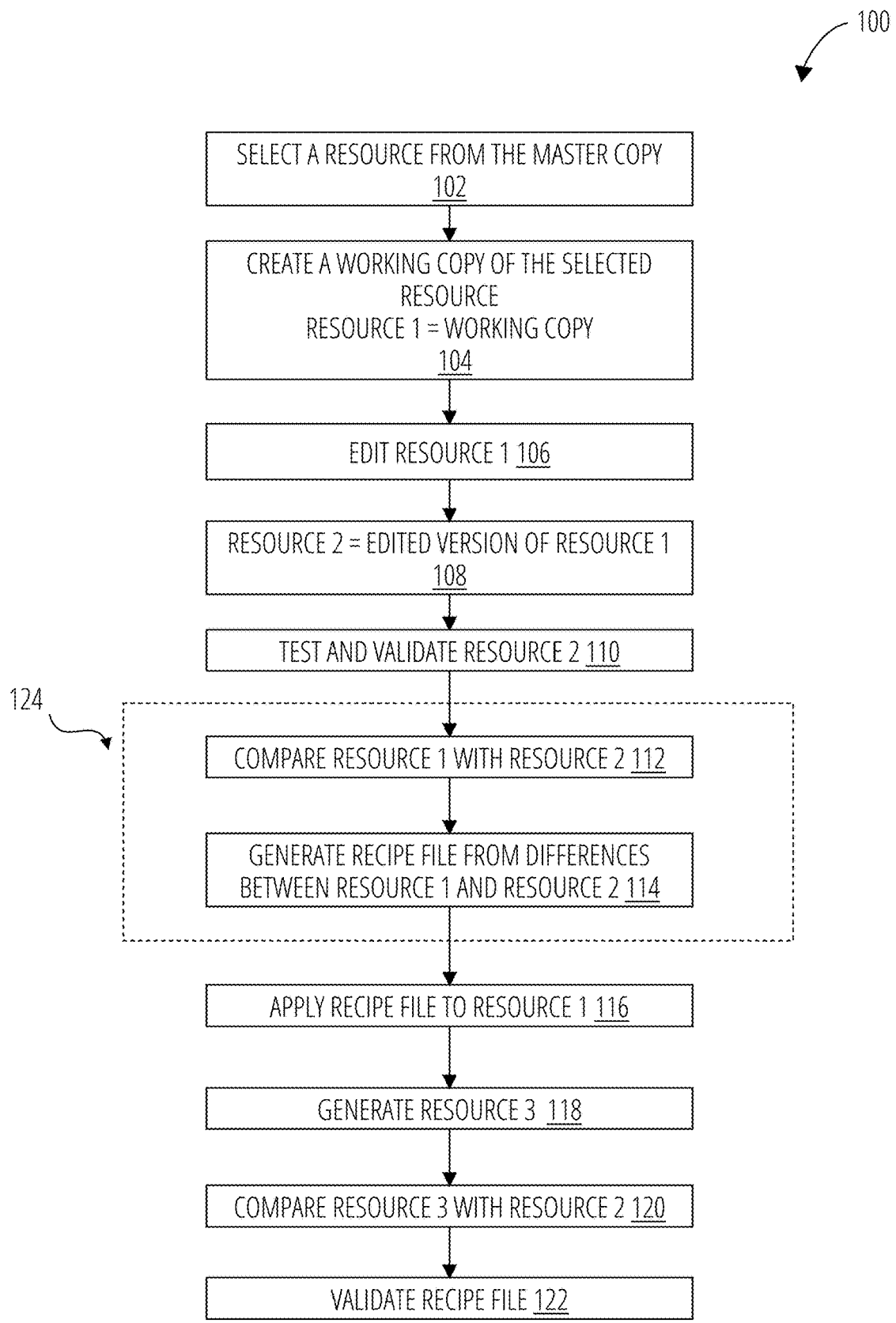
FIG. 1 illustrates a flowchart 100 in accordance with one embodiment.

Before turning to the figures, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Resource Generation/Management Tool

Rule-based systems and methods for customizing a complex business solution comprise the use of a master-copy of all-encompassing resources that make up the business solution. The master copy can be fully documented and fully tested. In some embodiments, such a master copy may be very large and may provide a complex solution since it needs to cover many industries, planning systems and all configuration options.

Rule-based systems and methods for customizing complex business solutions further comprise: creation of a set of rules that: i) capture dependencies between configuration options; and ii) define which resources, components, and sub-components are needed or can be excluded. In addition, the system includes methods for altering the solution presentation or business logic through a rich set of operations supported by a toolkit. These rules can be declarative and do not require programming. The rules can be generated by manually configuring a resource or component, comparing it to the master copy to capture the modifications, and annotating the modifications. "Annotate" means to tag each change to one or more resources (that comprise the overall business solution) with the business objective (or capability) that the resource change is related to, thus creating a menu of configuration options to choose from, when building future solutions. Over a longer period of time, the system will accumulate and codify the domain knowledge needed to build solutions and systematically organize that knowledge into a hierarchy of options and sub-options to choose from.

It is expected that some duplication of resources, especially shared components, may be needed. The toolkit can select the correct shared component and swap/insert it as needed. This provides a way to alter the business logic with a minimum of overhead (that is, maintaining several copies of some shared components). This 'modular' approach is advantageous from a testing perspective. Swapping a well-defined subcomponent is a low-risk, testable approach, unlike free-form changes typically used in creating custom solutions. There is a tradeoff between having some restrictions on how a solution can be modified, and the much larger benefit of a scalable and repeatable process with fewer errors.

Rule-based systems and methods for customizing complex business solutions further comprise: annotation of the rules with all available customer options such as industry, planning parameters, etc. From a menu of all available configuration options, a user may select those configurations that are required for a given customer. This configuration can act as documentation and as input into a test plan. Furthermore, this configuration may constitute a record/log of design decisions and can be persisted and added to the project documentation.

Rule-based systems and methods for customizing complex business solutions further comprise: running a resource configurator tool to apply the rules against the master copy to create a customer-specific solution. The configuration can be adjusted as new requirements are discovered and the resources can be re-generated based on the modified configuration.

It is expected that a user will need to further modify the generated resources manually. The toolkit provides capabilities to compare and reconcile the manual changes to the generated resources and components.

Unlike assembling a solution from building blocks, generating resources in this manner is a viable approach as most of the resource edits are to simplify or remove components that are not required from the master copy. Generation of new resources or new code/expressions are not required.

The resource management toolkit addresses this issue by generating simpler, specialized resources from the master copy based on annotated differences (or recipes), by pruning pieces that are not needed or by altering key pieces (such as shared components) to customize the resource in a controlled and repeatable manner. For example, if a system knows which subcomponents are tied to a business task, such as forecast outlier management, the system can find and remove these subcomponents if forecasting is not part of the solution scope.

FIG. 1 illustrates a flowchart 100 in accordance with one embodiment. Flowchart 100 describes an overall process for customizing complex business solutions.

The starting point is a master-copy of all-encompassing resources that make up a particular business solution. The master copy can be fully documented and fully tested. Such a master copy may be very large and may provide a complex solution. A large, complex master copy can include many functionalities, features, and options. For example, business intelligence tools often use an XML structure or relational database, to store layout of a report or worksheet. In some embodiments, the master copy covers many industries, planning systems and all configuration options. In some embodiments, resources include workbooks, widgets, task flows, scripts, scorecards, responsibility, process templates, hierarchies, forms, filters, dashboards and alerts.

At step 102, a resource (or business object) is selected; this resource will be modified. At step 104, a working copy of the selected resource is created. This working copy is also referred to as "Resource 1", which will serve as the basis of customization. At step 106, Resource 1 is edited to alter its business logic or presentation, thereby generating a customized version at step 108. The customized version is also referred to as "Resource 2". Prior to further use of Resource 2, the changes made at step 106 (i.e. editing of Resource 1) are first tested to ensure that Resource 2 is validated at step 110. This process follows the typical steps of developing a custom solution, such as: define use cases, expected inputs and outputs, define required views and their presentation, visualization, formatting, actions, and role based controls, design and execute test cases. In some embodiments test cases are automated to support ongoing regression testing.

At this stage, step 102 to step 110 can be repeated for other resources that have to be modified to accomplish the required business goal.

Once validated, at step 112, Resource 2 is compared to Resource 1 (which is the same as the resource in the Master Copy). At step 114, such a comparison is used to generate a solution metadata, or hereafter referred to as a "recipe file", based on the differences between Resource 1 and Resource 2. In general, the recipe file describes an annotated list of known modifications tagged with the business attributes that the modifications refer to. block 124, which is the combination of step 112 and step 114, is described in further detail in FIG. 5 below. With reference to FIG. 1, the recipe file is a list of commands/edits that transforms Resource 1 (working copy of the Master Copy) into Resource 2. Examples of commands/edits found in a recipe file are discussed below with reference to FIG. 2.

At step 116, the recipe file generated at step 114 is applied to Resource 1 (working copy of the Master Copy) which generates "Resource 3" at step 118. Resource 3 is a second copy of the customized workbook that is generated from the original workbook in the Master Copy, based on the list of differences in the recipe file. In order to ensure that the generation process (at step 118) is accurate, a comparison is made between Resource 2 and Resource 3 at step 120. That is, the generated resource (Resource 3) must be identical to the manually customized resource (Resource 2), which results in the validation of the recipe file at step 122. Further processes involving the recipe file are described below.

FIG. 2 illustrates examples of operations 200 in a recipe file for a workbook, in accordance with one embodiment. The examples of operations 200 are examples of commands/edits that can be applied to a workbook or a worksheet.

For example, basic operations 212 lists common operations applied to a workbook such as deleting and hiding; basic operations 212 include 'delete column', 'delete worksheet', 'delete variable', 'delete expression section', 'delete component', 'delete command', 'delete drill to detail', 'hide column', 'hide worksheet' and 'column editable'.

Furthermore, data model operations 210 list examples of operations applied to data models in a workbook. Data model operations 210 take a superset and use only those portions that are needed, thereby reducing the complexity. Data model operations 210 include 'rename table', 'rename field', 'delete table', 'delete field' and 'copy table', for example.

Figure 3A:
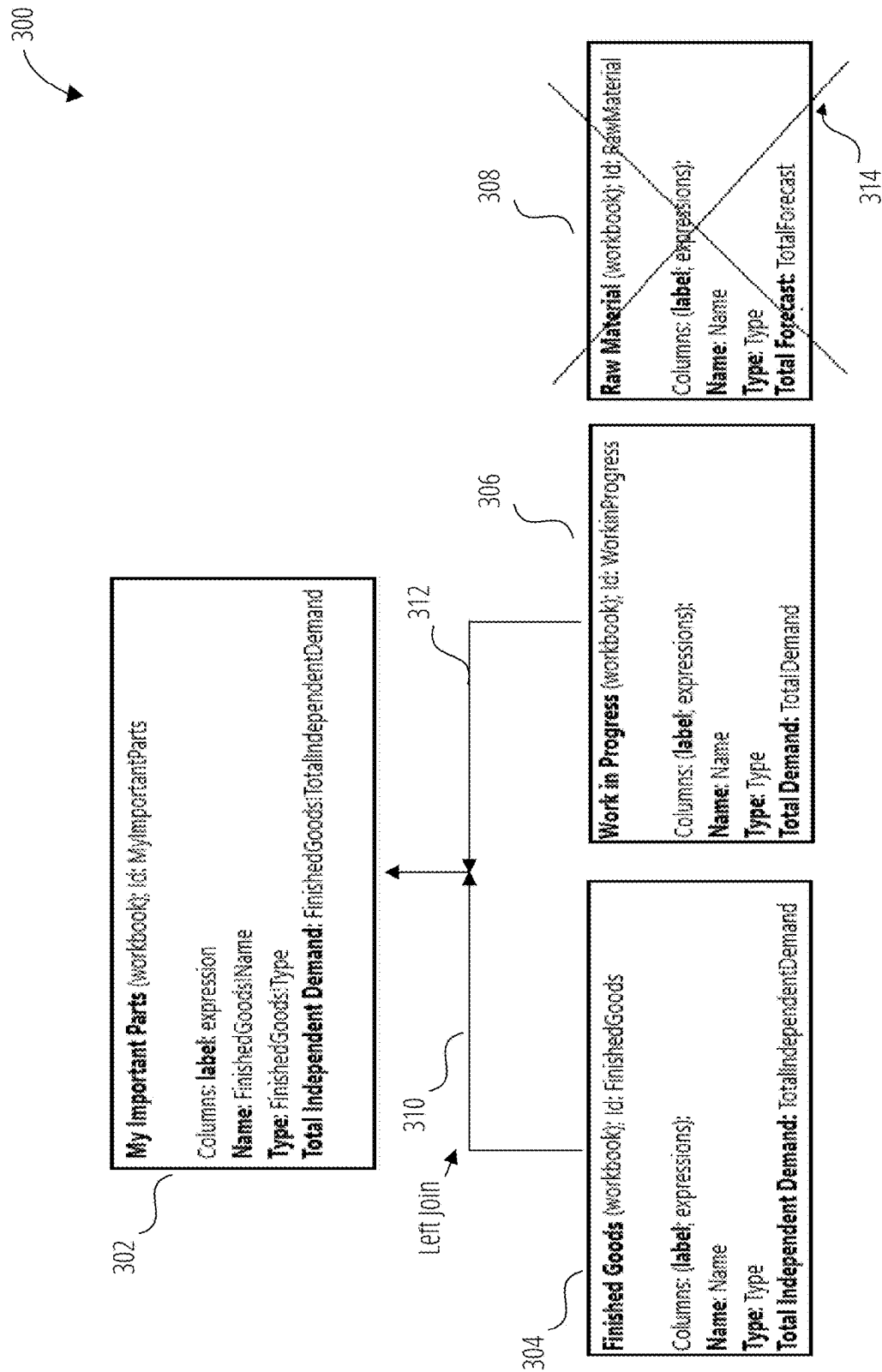
FIG. 3A illustrates an example of a 'Swap Component' operation in accordance with one embodiment.
Figure 3B:
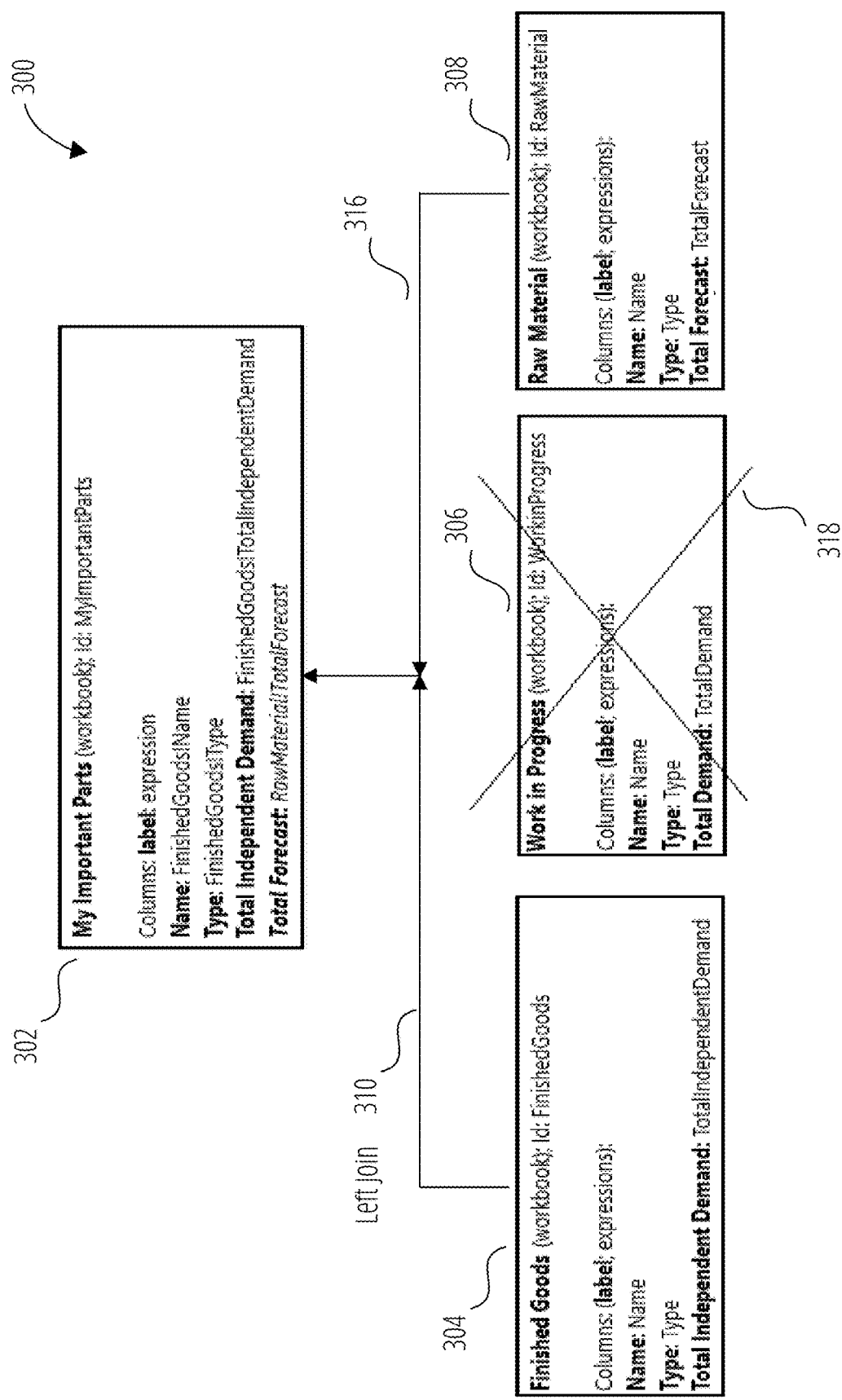
FIG. 3B illustrates an example of a 'Swap Component' operation in accordance with one embodiment.

In addition, complex operations 204 lists commands that alter business logic; these include 'swap component', 'swap library workbook', 'search replace expression', and 'swap dependent resource'. For most of these commands, two copies of the workbook are maintained instead of maintaining two entire templates. This reduces overhead in terms of solution development, maintenance, and testing effort. In addition, there is an enhanced simplicity. For example, swapping components requires changing joined dependencies, updating columns, and the like. Such changes usually require hundreds of lines of code. This is replaced by a single command (i.e. 'swap components'). The "swap components" command replaces one or more building blocks with other building blocks. For example, in database query, "swap components" can replace one or more source tables or views is a query with one or more replacements. An example of "swap components" is shown in FIG. 3A and FIG. 3B.

Other examples of operations include refactoring operations 208 that lists commands that change terminology in a workbook, thereby enhancing usability in various industries or creating localized versions of resources in other languages. Examples of such commands include 'rename columns', 'rename column ID', 'rename worksheet', 'rename worksheet ID', 'rename workbook', 'rename table' and 'rename field'.

Packaging operations 206 provide a list of commands that help to assemble a final solution based on a final set of components; these include 'add resource', 'rename resource', 'add name space', 'add macro', and 'add profile variable', for example.

There are also general purpose operations 202 that list commands that set any workbook property as needed, since predefined operations may not cover all cases. This provides an extensibility point to address use cases which we have not been planned for explicitly. Examples shown in FIG. 2 include 'set workbook property', 'set worksheet property', and 'set column property'.

FIG. 3A illustrates an example of a 'Swap Component' operation 300 in accordance with one embodiment.

The Master Copy has three resource worksheets: Finished Goods worksheet 304, Work in Progress worksheet 306, and Raw Material worksheet 308. In the embodiment shown in FIG. 3A, the workbook copy My Important Parts worksheet 302 is a combination of the Finished Goods worksheet 304 and the Work in Progress worksheet 306. As such, the tool can safely delete the Raw Material worksheet 308, which is denoted by the large 'X' 314. Records in the Raw Material worksheet 308 are not being used in My Important Parts worksheet 302.

The My Important Parts worksheet 302 is built with all of the records from the Finished Goods worksheet 304 combined with all of the records from the Work in Progress worksheet 306 where "Name" and "Type" values match. This is called a Left Join 310 connection, in which everything from the Finished Goods worksheet 304 is used. With regards to joining Work in Progress worksheet 306 (indicated by item 312), records from the Work in Progress worksheet 306 are joined, where 'Name' and 'Type' match records in the Finished Goods worksheet 304.

In this example, the SwapComponent action "swaps" the Work in Progress worksheet 306 with the Raw Material worksheet 308. This causes the JOIN criteria to change and makes one of the column expressions invalid (the column that references the Work in Progress worksheet 306). In addition to the SWAPComponent command, the recipe file includes a command to add a new "RawMaterial!TotalForecast" column to the My Important Parts worksheet 302. In this case, there is no worksheet filter on the Work in Progress worksheet 306 referencing the "swapped" worksheet. However, it there was such a filter, it would be removed as well as it would no longer be valid.

The results of the SwapComponent action applied to My Important Parts worksheet 302 in FIG. 3A, is shown in FIG. 3B. After the swap is completed, it changes the join to use the Raw Material worksheet 308 instead of the Work in Progress worksheet 306. The Work in Progress worksheet 306 is no longer part of the My Important Parts worksheet 302; as such, it is marked as deleted (denoted by the large 'X' 318. As in FIG. 3A, the Left Join 310 connection uses everything from the Finished Goods worksheet 304. With regards to joining Raw Material worksheet 308 (indicated by item 316), records from the Raw Material worksheet 308 are joined, where 'Name' and 'Type' match records in the Finished Goods worksheet 304.

Figure 4:
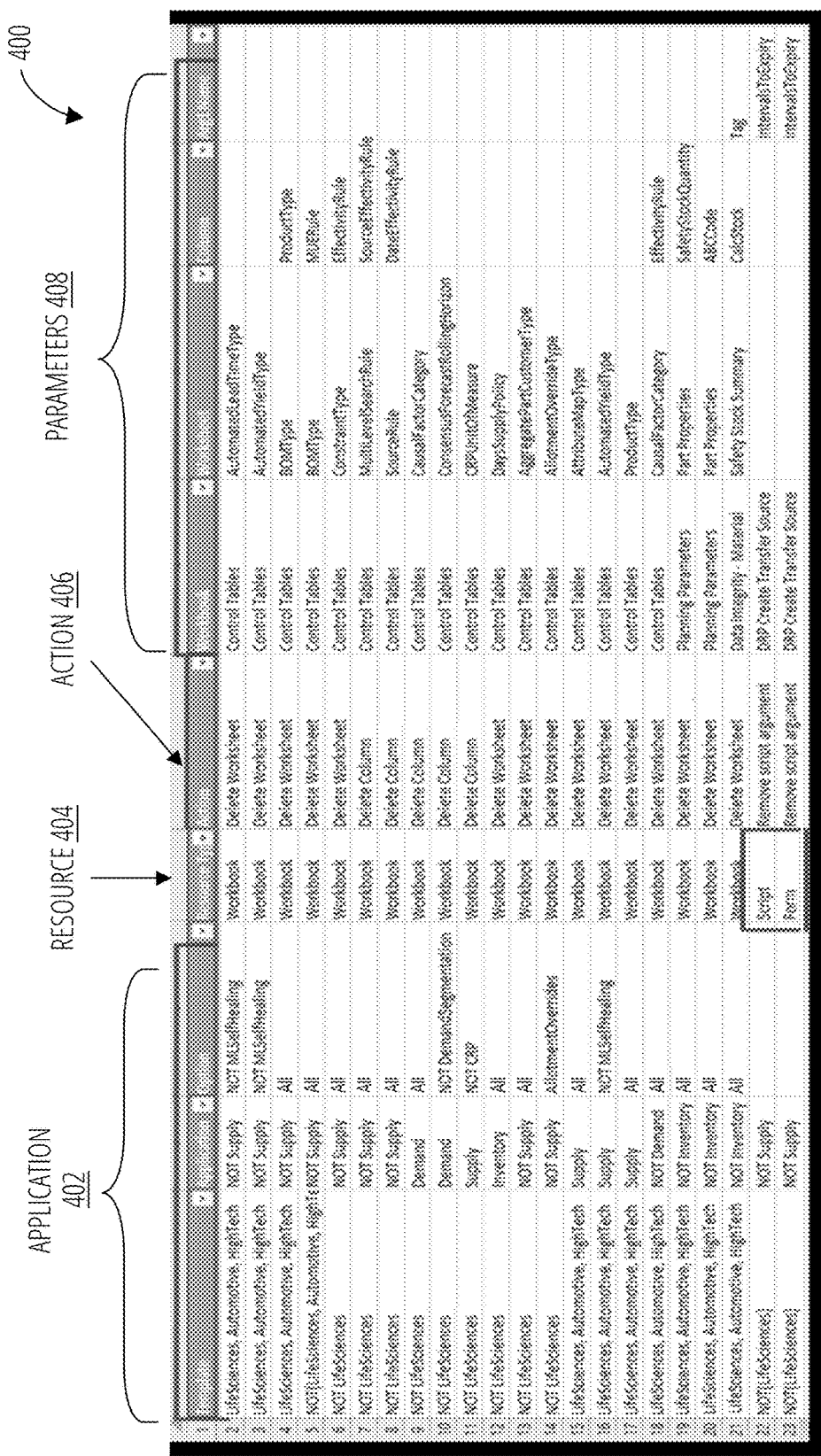
FIG. 4 illustrates a sample recipe file 400 in accordance with one embodiment.

FIG. 4 illustrates a sample recipe file 400 in accordance with one embodiment. In the embodiment shown in FIG. 4, the sample recipe file is derived from a master supply chain management template for a variety of industries.

The sample recipe file 400 includes a nested series of categories: application 402, resource 404, action 406 and parameters 408. The sample recipe file 400 shown in FIG. 4 is a subset of a master file for a specific customer or a solution or industry. This is for illustration purposes of how simple rule-based annotations can be used to categorize a variety of changes/customizations. In general, complex business solutions comprise complex business objects with thousands of variants. The system can learn from the customizations and the annotations, and can construct an expert system to assist in automating as many tasks as possible, thereby lowering the overall cost and time to deploy.

In the embodiment shown in FIG. 4, the category application 402 refers to when to apply a given command. Application 402 itself has three sub-categories: template, functionality and options that are related to specifics of the supply-chain management template. For example, the 'template' subcategory refers to one or more industry templates that a particular command is applied to. In FIG. 4, row 2 indicates that the ensuing command applies to the three industry templates Life Sciences, Automotive and High Tech. The template category can also indicate which template(s) should not be subject to a particular command. For example, rows 6-14 indicate that the Life Sciences template should not be subject to the commands listed in each of the respective rows.

In addition, each industry template has an associated series of defined functionalities and options. In supply chains, examples of functionality areas include supply planning, demand optimization, inventory optimization, and sales and operation planning (S&OP). Continuing with the example in row 2, the 'Supply' functionality should not be applied to the Life Sciences, Automotive and High Tech templates for the command in row 2. In another example, row 6 indicates that the command (associated with row 6) should not be applied to the Life Sciences industry template, and should not include the 'supply' functionality. In another example, row 15 indicates that the 'supply' functionality is to be applied with the Life Sciences, Automotive and High-tech templates.

Finally, the application 402 includes a sub-category of options, such as 'allotment overrides', 'demand segmentation', and 'machine learning self-healing', for example. These options can refer to types of analyses available for the supply-chain management embodiment.

Once the category application 402 (i.e. Columns 'template', 'functionality' and 'options') is specified, the type of resource 404 that will be used, is specified. In the example shown in FIG. 4, the majority of commands are for a workbook; however, rows 22 and 23 indicate that the resource 404 can also be a script and a form, respectively.

Once the resource 404 is specified, an action 406 applied to the resource 404 is listed. The various commands listed for the worksheet have been discussed above, with reference to FIG. 2; these include, for example, 'delete worksheet', 'delete column', and the like. A more comprehensive list is provided in FIG. 2. Non-worksheet actions include, with reference to row 22, the action 406 associated with the script resource is 'remove script argument'. Similarly, from row 23, the action 406 associated with the form resource is also 'remove script argument'.

Parameters 408 associated with a given action 406 are also provided. In FIG. 4, this includes the workbook name, the worksheet name, column and argument name. In summary, resource 404, action 406 and parameters 408 collectively describe the details of each change/customization, while application 402 annotates that change to state the business purpose and group related changes together.

Figure 5:
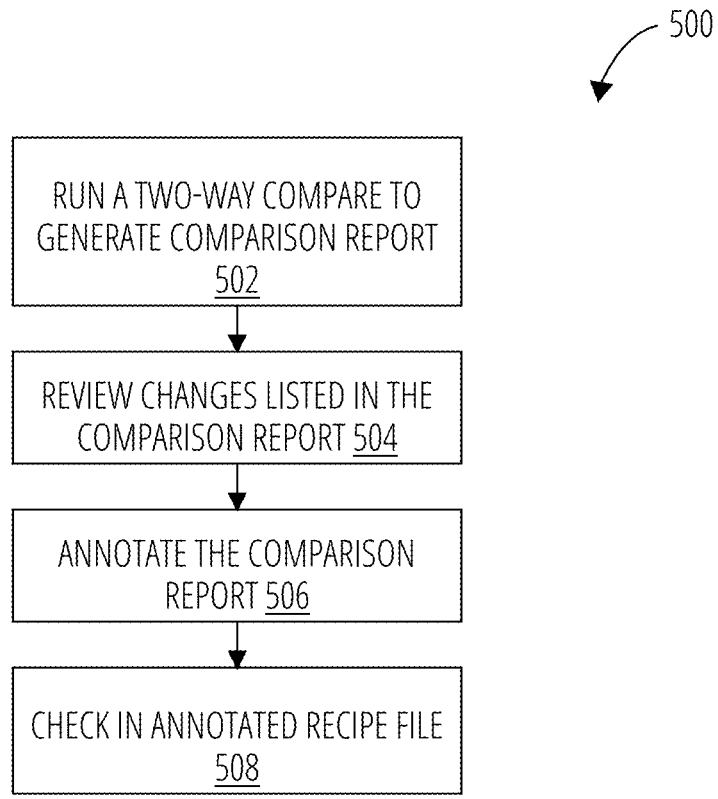
FIG. 5 illustrates a flowchart for creating a recipe file from a comparison report in accordance with one embodiment.

FIG. 5 illustrates a flowchart 500 for creating a recipe file from a comparison report in accordance with one embodiment. In summary, the two way compare creates a list of changes as input to a recipe file; the system automatically collects some markup; and a team periodically reviews and may add final tags.

With reference to block 124 of FIG. 1, FIG. 5 illustrates a flowchart 500 for creating a recipe file from a comparison report. At step 502, a two-way (schema-aware) compare is applied on resource 1 (a working copy of a master copy) and resource 2 (an edited version of resource 1 which) in order to generate a comparison report. Details of the two-way compare are discussed further below. Resource 2 has been tested and validated prior to the application of the two-way compare.

The comparison report lists the changes made to resource 1 in order to arrive at resource 2. These changes are reviewed to make sure that there are no unexpected changes. For example, an author may have made changes and forgotten about them. Or an author may have tried different approaches to achieve the business objective. Since the process is iterative, unintended changes can creep in. The review seeks to eliminate such unintended changes.

Furthermore, these changes are reviewed at step 504 to ensure each change is related to the business objective that the user is working on. In some embodiments, the comparison report is an Excel file with at least six tabs to display various views of changes. In some embodiments, reports may contain between 10,000 and 100,000 individual differences. The tools aim to eliminate the noise from the reports and organize/categorize the changes to make it possible to handle the complexity of the business objects and the volume of 'moving parts'. This refers not only to the number of differences, but also cascading changes, dependencies, etc. The Excel multi-tab format is one way to visualize and organize changes.

The example shown in FIG. 5 of creating a simple recipe file from a comparison of two versions of a resource does not adequately satisfy requirements of a fully-fledged system for managing customizations of enterprise class software and solutions. Such a system requires management of a plurality (for example, hundreds) of versions or a plurality (for example, thousands) of resources with a plurality (for example, hundreds) of combinations of options and a plurality (for example, hundreds) of users accessing the system. Therefore, a complete system can be further enhanced to manage the large volume of resource variations in a multi-user environment. Such a complete system can employ a database/repository for managing the recipes generated from analyzing customizations performed by all users, annotating and cataloging the customizations, and associated tools to support the required processes and presentation of this metadata in a usable manner.

Some of the tabs reflect the hierarchical nature of the resource—for example: Workbook→Worksheet→Column. Some of the tabs can focus on changes to important collections. In a workbook this is a list of worksheets, or list of columns. In some embodiments, where the resource is a task flow, it is a list of steps and sub-steps.

Each business object (i.e. resource) is different, but an author naturally thinks of these business objects as hierarchical entities. The two-way compare report is "schema-aware", in that it uses the knowledge of how the business object is built in order to produce a report that makes sense to the author.

The report also generates an action detail and an action summary for each action or change. The Action Detail is intended for use by the recipe generator; the action detail contains all details and parameters needed to perform an action. For example, if a new column is added in a spreadsheet, the detail report will contain every relevant column property. The Action Summary, on the other hand, includes important changes only and summarizes other changes. In the example of a new a column added in a spread sheet, the Action Summary only contains one entry for the new column: "Column Added+column name and display header", which is enough to identify the column. In an example where a column is modified, the comparison report will provide a count of changes and a link to see what those changes were; any "noise" is eliminated.

At step 506, the comparison report is annotated. That is, each change is associated with the business purpose that it serves. The list of change alone is not sufficient to create a recipe file; each change must be associated with a business objective prior to the creation of a recipe file. As an example, an author can work in small increments, while checking in their changes frequently; since all the changes are likely be for the same business purpose, the same comment can be applied to all the changes. If the author checks in more changes at the same time, the changes are tagged (i.e. annotated) to tie the changes to the business objective. The generation of the recipe file, based on the differences between resource 1 and resource 2, corresponds to step 114 of FIG. 1. At step 508, the annotated recipe file is checked in.

The flowchart 500, which describes an overall process for creating a recipe file from a comparison report, can be elucidated in further detail. Described above is a process where an author continuously edits a resource; the system learns and catalogs the changes as the author proceeds, effectively becoming an expert system for customizing the resources. In general, the author obtains a working copy of the master copy (for example, step 102 of FIG. 1) or a known version of the resource as the starting point. Here, "known version" refers to which repository the resource came from and how the point of origin relates to the master copy. Not every author will start with a master copy; an author can start with any copy, as long as the origin of that copy is traceable to the Master Copy. It is fine to start with any version of the resource since the method processes incremental changes made in each edit of the resource.

At this stage, the author checks out a resource(s) to modify (whether it is a working copy of the Master Copy or a version of the resource). The author then works on a task and makes one or more changes to the resource, then checks in and applies a comment. The comment can typically include a reference to the task that specifies what the change is for. In some embodiments, the reference to the task can be made using JIRA™ software. The task may have links to documentation, requirements, specs, test plans, etc. This makes it useful to capture a ticket number. In some embodiments, there is a requirement that every check-in starts with the JIRA task/ticket number. As an example, it has the following form: "RRP123456—Added new component worksheet to calculate incremental availability". That is, a ticket number is provided with a one-line description. This can be generated for each change made to the working copy of the resource. As discussed above, the system can harvest all of the changes after a certain time period (for example, after completion of a project, or every two weeks, or any other regular period of time). In some embodiments, harvesting entails processing every check-in, during which: resources are compared; a list of changes is generated which is used as input to a recipe; each change is tagged with a timestamp, a user-id, a work ticket or bug report, and a capture of the one-line description of the change. The system can retrieve the one-line description of what the work ticket or bug report said. The system can also set up links in the report so the JIRA ticket cam be opened and reviewed if needed.

The system can further analyze the changes. In some embodiments, the system finds changes that can be collapsed—for example, the author may have made several attempts to implement a change, yet changed their mind. Instead of having the same property change multiple times, the system only looks at the original value, and the value at the end of the time period for harvesting. This removes noise in the editing process. In some embodiments, the system finds any potential conflicts—which are subsequently manually resolved.

In some embodiments, a team only needs to review the list of changes and the automatically collected annotations, looking for: check-ins that may have been mislabeled; and check-ins that may have some unrelated changes and were not tagged correctly. The differences can be split into two check-ins or each difference can be tagged with the correct business purpose. Any form of tags can be used, so long as it make sense for the business objective and change. The tags can later act as a set of menu items when generating resources using an effective recipe file. In some embodiments, the tags are hierarchical.

Once tagged, the recipe file is merged with the master recipe database and any conflicts (with the master recipe database) are resolved.

Figure 6:
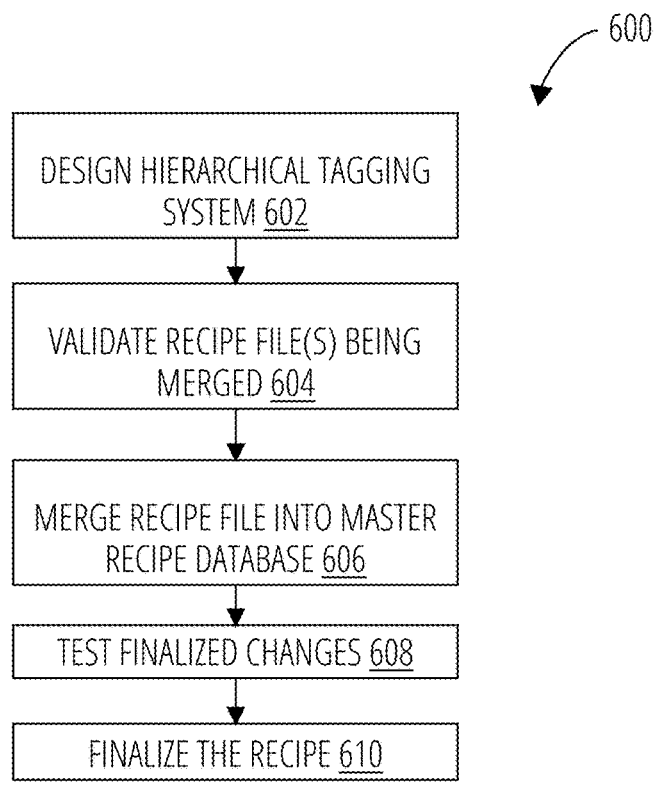
FIG. 6 illustrates a flowchart for merging a recipe file into a master recipe database in accordance with one embodiment.

FIG. 6 illustrates a flowchart 600 for merging a recipe file into a master recipe database in accordance with one embodiment.

As a resource is customized from a master copy through a number of edits and changes, it is advantageous to accumulate and catalog the knowledge accrued of how to customize a given resource (i.e. business object). This can be achieved by merging changes from ongoing customization into a master recipe database. However, it should be kept in mind that changes may have contradicting objectives and may touch the similar properties. Therefore, when merging a recipe file into the master recipe database, the recipe file is first analyzed for contradictions or conflicts. While such an analysis, and subsequent merging, may be performed on a single checked-in recipe file, it is better to perform such actions periodically or on a business cadence, in order to minimize unnecessary overhead. For example, the merging of recipe files can be done at the end of a project sprint, or on a regular basis (e.g. every 2 weeks or so).

With reference to FIG. 6, at step 602, a hierarchical tagging system is designed. The tags can serve as a menu when generating the resources from the master copy of a resource. This is described in further detail at step 708 in FIG. 7. Any hierarchical convention that suits the resource structure, can be adopted.

At step 604, each recipe file that is being merged, is validated, by checking that all changes within a given recipe file are annotated correctly; and by ensuring that there are no conflicts due to the changes.

At step 606, the validated recipe file(s) are then merged into the master file database. This comprises a number of sub-steps, such as: checking for conflicts with other recipes in the master recipe database; validating consistency and completeness of annotations; collapsing changes when possible (as an example, a given property was changed multiple times); and if needed, splitting unrelated changes.

At step 608, the finalized changes are tested, as follows. An effective recipe file is generated from the master recipe database (based on the options selected for a given customer), where the effective recipe file includes all the annotated changes that had just been added to the master recipe database. The effective recipe file is then applied to the Master Copy of the resource to generate a customized resource (see step 116 and step 118 of FIG. 1). A two-way compare is then made between the generated customized resource and resource 2, to ensure that the two resources match (see step 120 of FIG. 1).

Once the testing is completed at step 608, the recipe is finalized at step 610. Once the recipe files are merged, the latest copy of the resource(s) will act as a reference point for the comparisons for ongoing development. The origin of changes is tracked (much like a chain of evidence).

Figure 7:
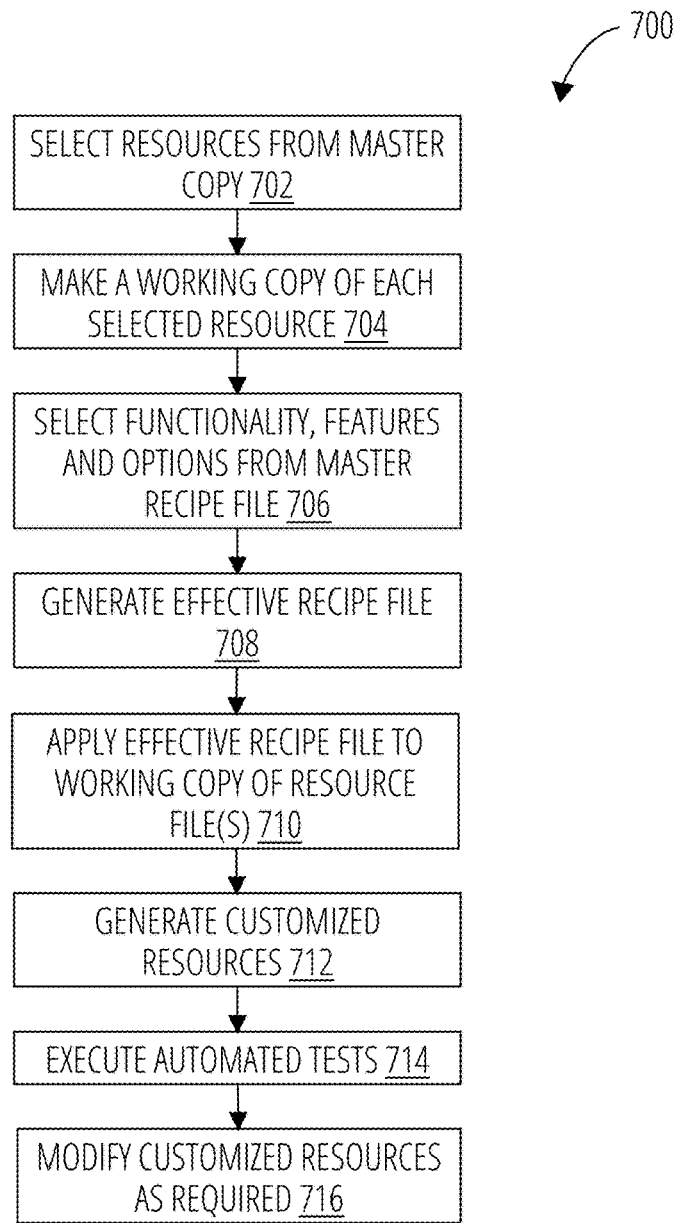
FIG. 7 illustrates a flowchart 700 in accordance with one embodiment.

FIG. 7 illustrates a flowchart 700 in accordance with one embodiment. Flowchart 700 describes generation of a customized resource from a Master Copy.

A business solution for a customer project can include one or more resources. These resources are selected from a Master Copy at step 702. In some embodiments, the Master Copy is directed to a number of different industries, each with a distinct supply chain, while resources include workbooks, widgets, task flows, scripts, scorecards, responsibilities, process templates, hierarchies, forms, filters, dashboards and alerts.

A working copy of each selected resource is made at step 704. Once a resource is selected, the master recipe database is used to select functionality, features and options from choices available in the master recipe database at step 706. Within these core functionalities, there can be additional options. There are usually hundreds of combinations—a clear indication that it is not viable to maintain so many different templates for each set of combinations. In some embodiments, the master recipe database can be used to select a customer industry, one or more functionality areas of the selected industry, and key planning parameters. Examples of industries are numerous, and include life sciences, high tech, aerospace, defense, automotive, etc. In supply chains, examples of functionality areas include supply planning, demand optimization, inventory optimization, and sales and operation planning (S&OP).

Based on the selection at step 706, an effective recipe file is generated from the master recipe database at step 708. The effective recipe file includes a subset of all possible changes based on the business objectives that one is trying to achieve; that is, the effective recipe file contains only those modifications that are relevant to a particular customer project. As an example, one business objective can be inventory planning for a pharmaceutical company that uses continuous manufacturing processes with ingredient expiry and sourcing restrictions in countries of origin. A different business objective can be inventory planning for a high-tech company that does discreet manufacturing and performs multi-level sourcing optimization and allows for alternate components and pools inventory since it is a contract manufacturer. These are related business cases—each of which requires dramatically different business logic and presentation for realization. Each business objective has its own effective recipe file that includes commands, such as selection of a particular industry resource template (pharmaceutical or hi-tech) and key planning parameters for each. The business solution for each business objective is generated from a single master copy by first generating an effective recipe file for each business objective, and then applying the effective recipe file to a working copy of each resource file selected from the master copy (step 702 and step 704).

The effective recipe file is applied to a working copy of the resource at step 710, in order to generate a customized resource at step 712.

At step 714, applicable automated tests that are identified based on the effective recipe file, are executed to ensure a valid starting point for further customization. The output from the toolkit does not usually give a completed custom solution. Instead, a starting point is provided that is as close as possible to a final customization. For example, when an organization enters a new domain, such as a new industry, the solutions may initially be completely customized. However, for subsequent customers, the customizations can be rolled into the master copy and annotations added to the master recipe database. These steps add the knowledge for the unique aspects of the new domain and make creation of subsequent solutions for similar customers cheaper, faster and more repeatable, thereby increasing the efficiency of computer operations and solution development and customization.

Finally, at step 716, additional modifications are made to the customized resource (generated at step 712) as required. The effective recipe file is metadata that contains the knowledge about how to customize a solution, which part of the master copy relates to which use case of functionality, etc. The collected metadata includes resource and component dependencies. The by-product of generating a set of customized resources provides a test plan that identifies which tests contained in the overall test suite can be executed and what test coverage can they provide. Similarly, parts of the solution documentation can be auto-generated as well.

In summary, the rule-based systems and methods described above apply to a process where people continue working as usual; the system learns and catalogs changes, effectively becoming an expert system for customizing resources. In a variation of FIG. 1, an author obtains a master copy, or a known version of resources as a starting point from which to make changes. "Known version" can include information regarding which repository the resources came from; and how the point of origin relates to the master copy. In some embodiments, not every author will start with a Master Copy; instead, the author can start with any copy, as long as the origin of that copy is traceable to the Master Copy. There is no issue starting with any copy, since the systems and methods focus on incremental changes made in each edit.

In some embodiments, the author checks out a resource(s) to modify; the author works on a task and makes one or more changes. The author then checks in the modified resource and applies a comment. The comment can include a reference to the task that specifies what the change is for. The task can have links to documentation, requirements, specs, test plans, etc. The task can be linked to a ticket number. For example, a check-in can have a ticket number and task description such as "RRP123456—Added new component worksheet to calculate incremental availability", where "RRP123456" is the ticket number, and "Added new component worksheet to calculate incremental availability" provides a one-line description of the task. In most practical situations, such modifications occur over a fixed time period. The systems and methods harvest the list of changes made over the fixed time period, by processing every check-in, which can comprise: comparing resources; generating a list of changes as input for a recipe file; tagging each change with time a stamp, a user-id, a work ticket or bug report; and capturing the one-line description of the change. The tool will retrieve the one-line description of what the work ticket or bug report said. The tool can set up links in the report so that the ticket can be opened and review if needed.

In addition, the tools can analyze the changes in a number of ways. For example, the tools can find changes that can be collapsed—that is, the author may have made several attempts to implement, and changed their mind. Instead of documenting multiple changes in a property, the tools only examine the original value, and the final value at the end of the fixed time period. Furthermore, the tools can find any potential conflicts between changes, which may be resolved manually.

For completion, the list of changes and the automatically collected annotations may be reviewed by a team. Possible discrepancies can include: looking for check-ins that were mislabeled; looking at check-ins that had one or more unrelated changes and were not tagged accordingly; adding tags that make sense (the tags can act as a set of menu items when generating resources; the tags should be hierarchical).

Once tagged, the recipe file should be merged with the master recipe database and any conflicts should be resolved. Given this process, a 2-way compare (discussed below) creates a list of changes as input to a recipe file; the tools automatically collect one or more markups; and tags are manually reviewed and updated as required. In some embodiments, tags and annotations are organized hierarchically.

When an author plans on generating (or re-generates) a copy of resources, a dialog can be provided to the author, which shows all tags in the master recipe database to give the author a list of choices the system has been able to learn from all the modifications it was given as input. Once the author chooses the options/sub-options they want, an effective recipe file is generated and used to create a set of resources customized as per the author's choices. The checkboxes in the dialog can serve as documentation of what the author wanted to include in the customized resource; the checkboxes act as a manifest for the generated resources.

2-Way and 3-Way Schema-Aware Compare Tool

A low code platform substitutes configuration for writing code, thus enabling business users to build fairly complex applications without requiring programming skills. As an example, a low-code development platform (LCDP) provides an environment for development that is used to create application software through graphical user interfaces and configuration, instead of traditional hand-coded computer programming. For example, a user of a spreadsheet program (such as Excel™ and its associated Pivot functions) can build a complex application, by writing a few column expressions and filter expressions. There are a number of low-code platforms known in the art, such as SalesForce™, Wordpress™, Excel™, and Talend™.

Although simple relative to computer code, low code platforms (LCPs) may still produce complex artifacts. While some code/expressions may be embedded in these artifacts, these artifacts are primarily metadata that can be very structured and complex. A few characteristics of these artifacts are as follows: multiple, interconnected, complex business objects; they can be stored as XML; they can be stored in databases as binary large objects (BLOBs) or as interconnected objects; they can be developed using a graphical user interface (GUI), usually with property sheets or a custom authoring user interface; and they can include multiple-levels of nesting of business objects. Complexity aside, these objects are highly structured and backed by XML schemas, DB models and validation routines.

An LCP can include different types of objects (or resources), examples of which include a workbook, a dashboard, a widget, a task flow, a hierarchy a filter, a scheduled task, an alert, an automation chain, a form and a script. In some embodiments, a task flow refers to training. In some embodiments, the object type includes a process template and a responsibility template, both of which are collaborative-based objects types. An LCP solution can be complex, with over a thousand standard resources and over tens of thousands of internal dependencies.

As an example, a workbook is one of the more complex business objects in an LCP. It can have hundreds, or even thousands of properties. A workbook is a complex, deeply nested structure: a workbook is composed of a plurality of worksheets, each of which has a series of columns. Each level of a workbook has deeply nested properties or collections of properties. These may include some expressions (for example, column, filter, conditions), but the workbook is composed mostly of discrete properties. Furthermore, the properties may be interdependent. In some embodiments of a supply-chain management LCP, there are hundreds of thousands of workbooks, with millions of worksheets and tens of millions of columns.

Figure 8:
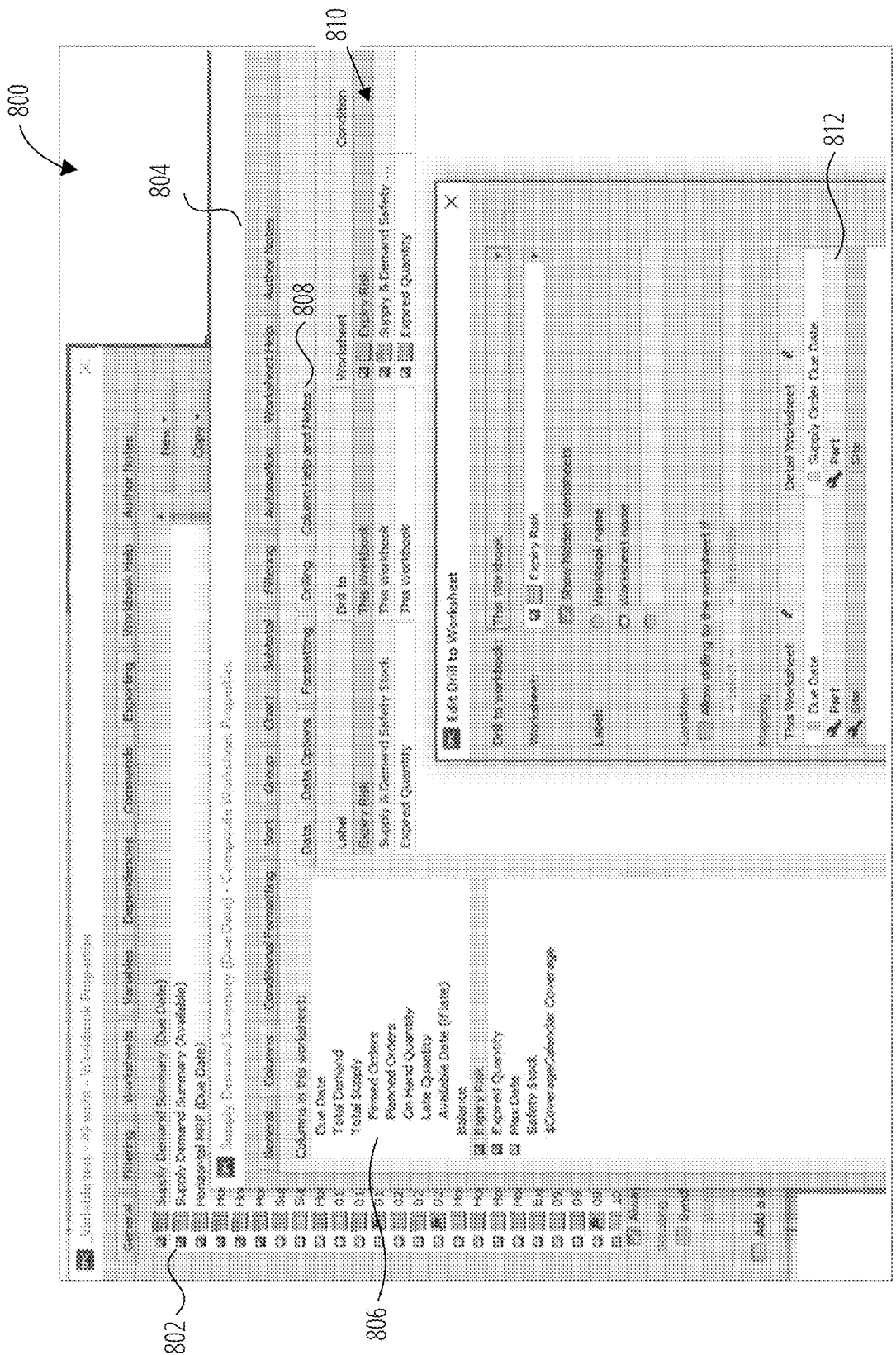
FIG. 8 illustrates a nested collection of properties of workbooks 800 in accordance with one embodiment.

FIG. 8 illustrates a nested collection of properties of workbooks 800 in accordance with one embodiment.

One of the biggest challenges in comparing workbooks is in comparing nested collections of properties associated with the workbooks. In FIG. 8, the complex nature of nested properties is shown in the form of an example of a four-level deep nested collection property. The first set of properties of the workbook includes an ordered list of worksheets 802, with the identification (ID) and name of each worksheet. In this example, the worksheet 'Supply Demand Summary (Due Date)' is further highlighted, and its properties 804 are shown. The property 'columns' of the worksheet is highlighted, and an ordered list of columns 806 in the worksheet is shown, along with the ID of each column. In the ordered list of columns 806, the entry 'Expiry Risk' is highlighted, thus showing the list of properties 808. The tab 'Drilling' is highlighted, which shows the ordered list of drill-to-detail 810, with no clear identifiers. Finally, the label 'Expiry Risk' is highlighted, showing an ordered list of mappings 812 with source and target IDs.

2-Way Schema-Aware Compare Tool

A solution to provide a relatively simple way to compare objects is to provide a compare tool that is schema-aware. This is accomplished by understanding the structure of an object and its internal dependencies, along with which fields identify items in a collection, and additional schema metadata. The compare tool can then properly interpret the differences between two objects and recognize the intent of a user's changes, while providing a much simpler comparison report.

A schema-aware compare tool can vastly reduce the noise in its reports, while properly recognizing the intent of the user's changes. The schema-aware compare tool uses identifiers, alternate identifiers, or heuristic matching rules to recognize that two items are the same and reports accordingly. It can accept mapping hints from the user to match items. It can also handle the hierarchical nature of business objects and produce clear reports. It can identify cascading add/delete operations that can be easily filtered out. For example, when a worksheet is deleted, all of its columns and associated properties are deleted as well. The schema-aware compare tool tags and categorizes changes to allow authors to focus on what is important for the author—for example focus on business logic and remove all formatting/display changes from the report.

Figure 9A:
FIG. 9A illustrates an XML compare report for four simple changes.

FIG. 9A illustrates an XML compare report 900 or four simple changes.

The four changes are: 1) delete the variable "MaxLevel"; 2) add one new variable; 3) rename the variable "ShowItems" and move it down the list; and 4) modify the variable "ModelSet" to add a new forecasting option. A standard XML compare report 900 includes several pages of differences (or "noise") that a user has to wade through, in order to ascertain the four simple changes.

Such noise renders the difference reports provided by standard compare tools unusable when comparing resources that are actively being modified and have a lot of changes. For example, a comparison of a standard planning sheet with a customized planning sheet amended by a customer can have over 25,000 differences. It is unwieldy and impossible to decipher, let alone produce, difference reports for such systems.

Figure 9B:
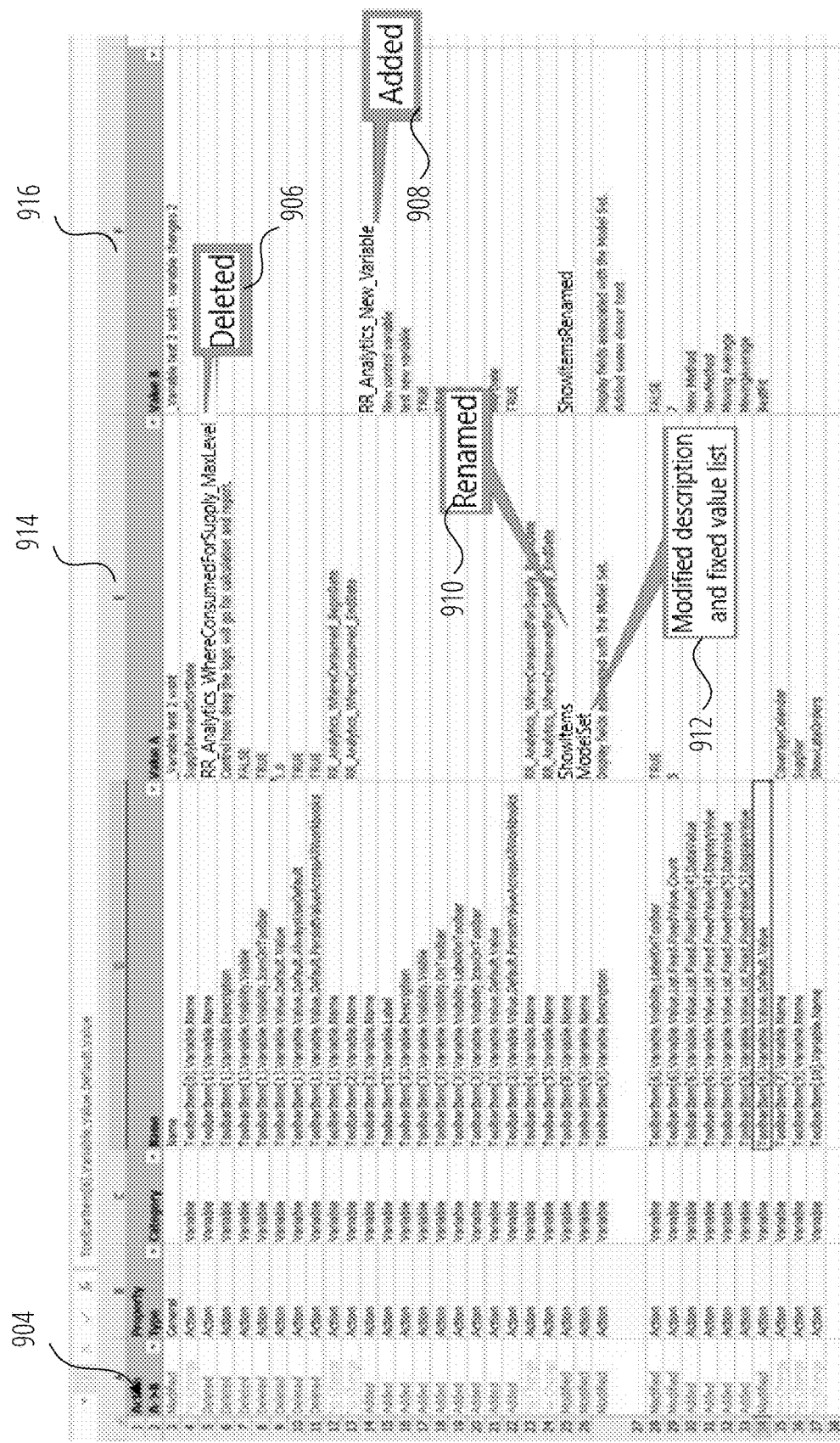
FIG. 9B illustrates a schema aware compare of four simple changes in accordance with one embodiment.

FIG. 9B illustrates a schema aware compare 902 of the same four simple changes shown in the XML compare report 900 shown in FIG. 9A. Version 'A' is the original version of a resource, while version 'B' refers to the amended resource.

The goal of the schema aware compare 902 is to recognize the author's intent and report it accordingly, while removing the noise caused by false positives that affects regular compare tools (for example, XML as shown in the compare report 900 of FIG. 9A).

In the embodiment shown in FIG. 9B, the schema aware compare 902 can detect and report the four changes made by the author, compared to several pages of differences from the standard XML compare report 900 shown in FIG. 9A.

Column A 904 summarizes each action in going from 'A' to 'B'. There are four types of actions listed: deleted, modified, added and 'no change'.

For example, the variable "RR_Analytics_WhereConsumedForSupply_MaxLevel" (row 5) has been deleted as shown by the corresponding "Delete" entry in column A 904 (and highlighted by item 906). It is present in column E 914 (where the value of the variable in 'A' is shown), but absent in column F 916 (where the value of the variable in 'B' is shown). Not only is the variable deleted, but so are attributes associated with the variable (rows 6-11), such as: the variable description (row 6); the visibility of the variable (row 7); the visibility of the variable icon on the toolbar (row 8); the variable default value (row 9); whether the variable default value is always used (row 10); and whether the variable default value persists across all workbooks (row 11).

In another example, the variable "RR_Analytics_New_Variable" (row 14) has been added in version 'B', as shown by the corresponding "Added" entry in column A 904 (and highlighted by item 908). This variable is absent in column E 914, but present in column F 916. Not only is the new variable added, but so are attributes associated with the variable (rows 15-22), such as: the new variable description (row 16); the visibility of the new variable (row 17); the visibility of the new variable on the toolbar (row 18); the visibility of the new variable label on the toolbar (row 19); the visibility of the new variable icon on the toolbar (row 20); the new variable default value (row 21); and whether the variable default value persists across all workbooks (row 22).

In another example, the variable "ShowItems" (row 25) has been renamed to "ShowItemsRenamed", as shown by the corresponding "Modified" entry in column A 904 (and highlighted by item 910). Since the variable has only been renamed, none of its attributes are modified.

Finally, the variable "ModelSet" (row 26) is modified as shown by the corresponding "Modified" entry in column A 904 (and highlighted by item 912). The modification of the variable "ModelSet" is further elaborated in rows 27-34. According to row 27, the variable description has been modified, as shown in the corresponding entries in column E 914 and column F 916. According to row 28, the visibility of the variable label on the toolbar has also been changed from "True" to "False". A fixed value list associated with the variable has been changed, according to Row 29. A new forecasting option has been added, as shown by rows 30-33. Finally, according to row 34, the variable default value has been modified.

Figure 10:
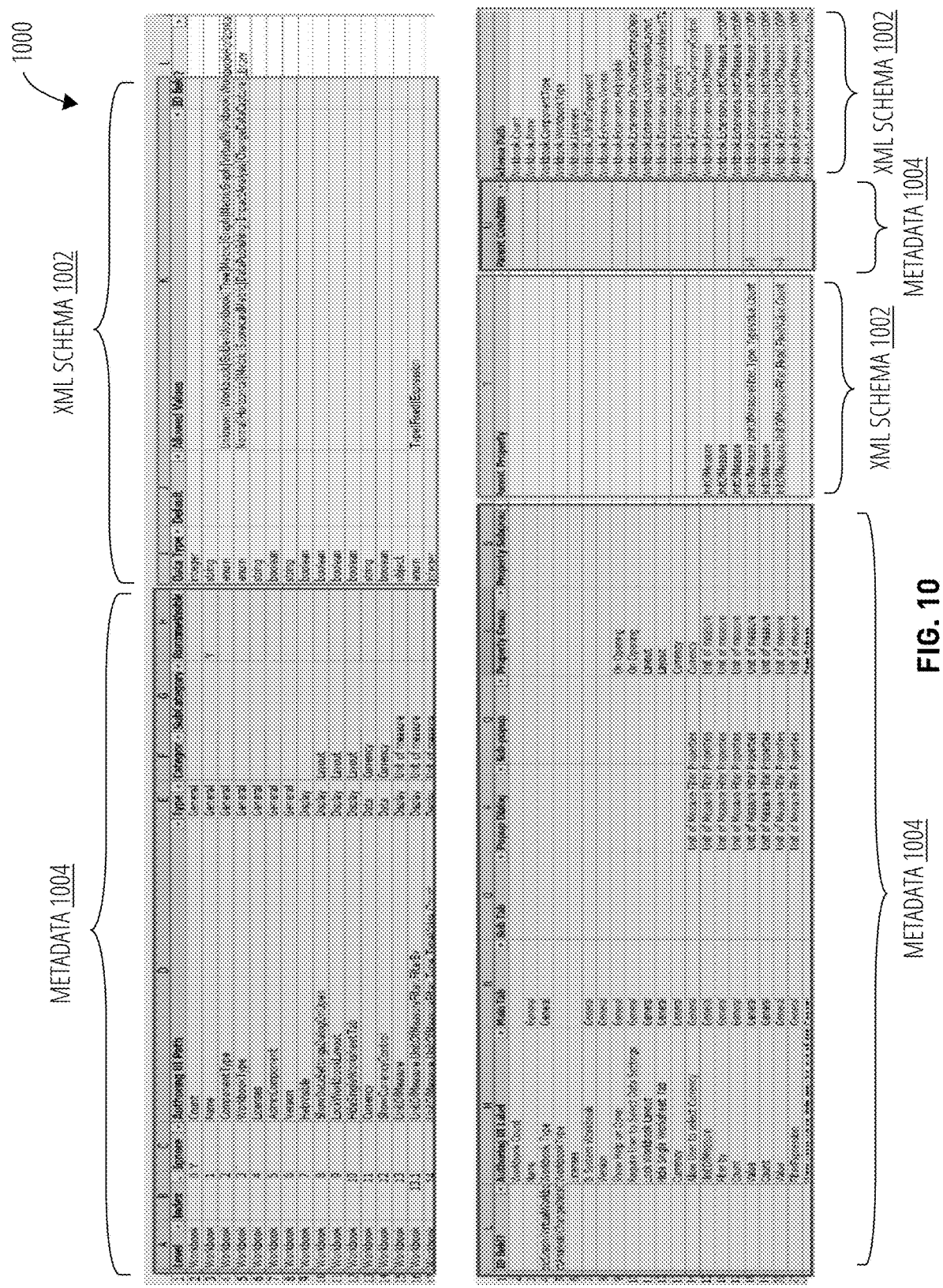
FIG. 10 illustrates use of metadata for creating a schema-away compare in accordance with one embodiment.

FIG. 10 illustrates use of metadata for creating a schema-away compare in accordance with one embodiment.

In the metadata example 1000, metadata 1004 goes beyond a standard XML schema 1002 or database schema, and captures not only an object structure, properties, property data types and relationships, but also the 'domain knowledge' that governs how authors or business consultants work with the software to create solutions for customers. The Metadata 1004 is intended to match the mental model of the solution, as perceived by the authors. This includes, for example:

i) capture ordered list of properties, the hierarchical nature of the business objects, identifying key component levels. For example: workbook, worksheet, column. This organizes the compare reports to match the authoring experience—summarizing changes at each key hierarchy level (like workbook, worksheet, column in some embodiments);
  ii) category, subcategory, functional group—tag properties to identify their purpose. For example "Data" tag will indicate the property affects calculation, while "Display" indicates the property affects how data is presented. This allows the author to easily filter the compare report to quickly focus on changes of interest, such as business logic, before reviewing report formatting;
  iii) organizing properties so they follow natural order of the authoring tools: left→fright, top→bottom. This gives the report a natural flow;
  iv) mapping to authoring UI—use the same terminology and map to the screens and dialogs involved in configuring the business object such as a workbook or a worksheet;
  v) parent property and dependencies—capture dependencies between properties (for example if a parent checkbox is not selected, the child properties should be ignored, even if they were stored in the resource definition);
  vi) validation rules, cascading effects if property is modified;
  vii) handling property collections: identifying properties, sorting/ordering properties, nested property collections; and
  viii) giving properties mnemonic names that match the terminology used by the authors. This is often different than the labels in the authoring UI.

3-Way Schema-Aware Compare Tool

Figure 11A:
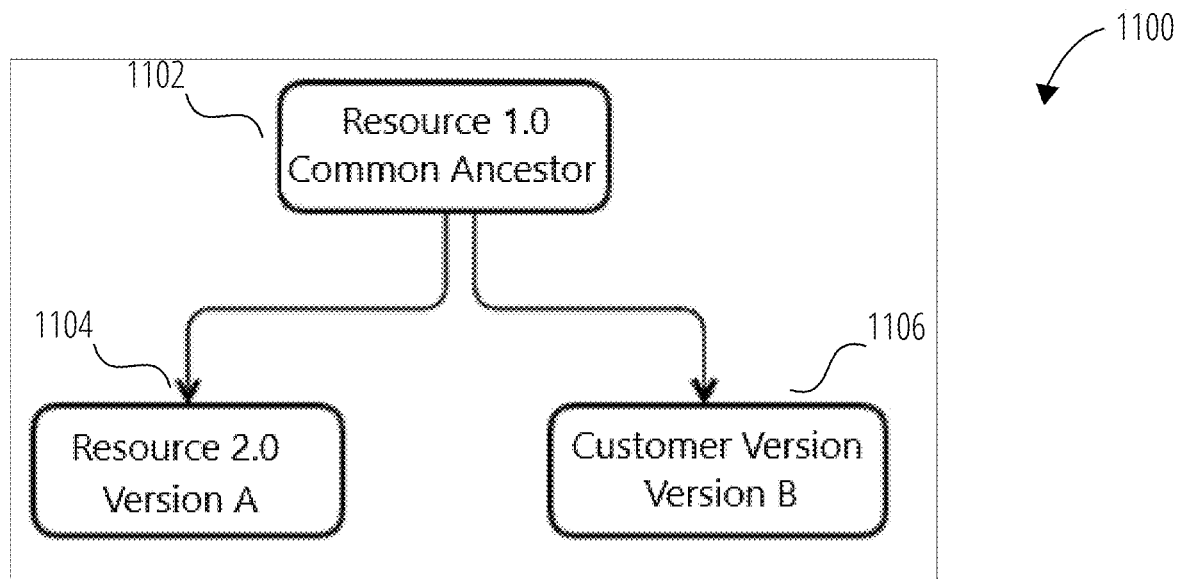
FIG. 11A and FIG. 11B illustrate a 3-way schema aware compare in accordance with one embodiment.
Figure 11B:
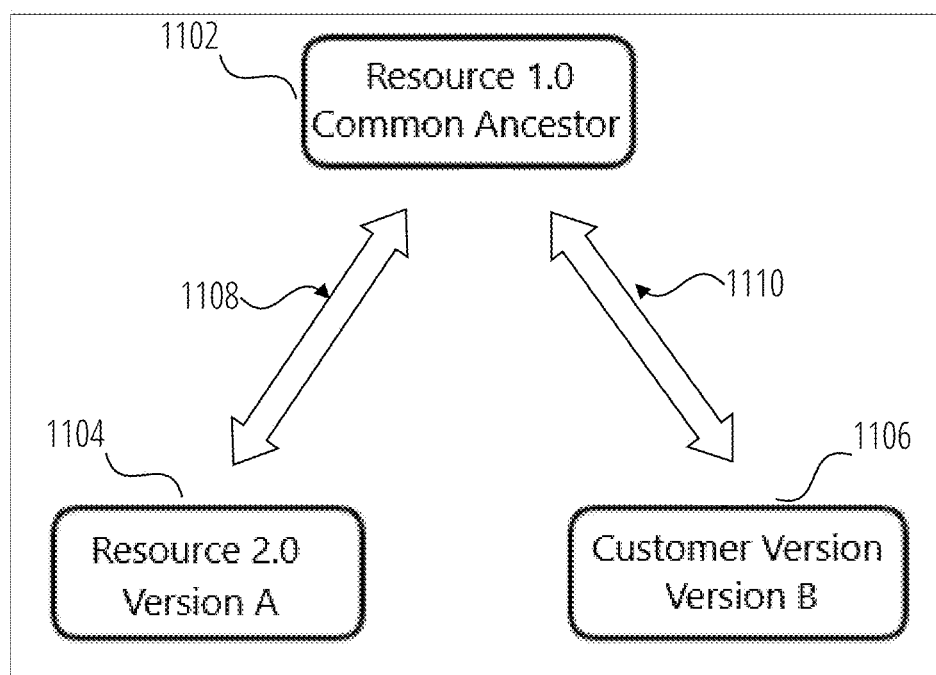

FIG. 11A and FIG. 11B illustrate a 3-way schema aware compare 1100 in accordance with one embodiment.

LCPs do not permit multiple authors to edit the same resource (for example, a workbook) at the same time. Traditionally, a user has to 'check-out' a resource, make changes, then check-in the modified resource to a repository. Then another user can check-out the resource and perform changes, sequentially. A simple compare tool is usually sufficient to review a small batch of changes, but not adequate for large-scaled, complex nested changes. For example, authors frequently work on private copies of resources. They also borrow building blocks from similar solutions they have created before (copy-paste pattern). Furthermore, multiple development streams often share the same resources. In addition, resources derived from a master copy are subject to changes through service updates and new versions.

It is virtually impossible to reconcile changes to a complex resource that reports over thousands of changes with another related resource by doing a direct 2-way compare between the two resources However, when the two resources share a common ancestor (for example both are derived from a master copy), then performing a 3-way, schema-aware compare easily identifies who made which changes and which changes made by the different authors can be in conflict.

This is illustrated in FIG. 11A, in which an original master copy of a resource, Common Ancestor 1102 (also known as Resource 1.0), serves as the basis for further modifications. For example, an update to Resource 1.0, results in Version A 1104 (also known as Resource 2.0). Similarly, a customer may copy Resource 1.0 (i.e. Common Ancestor 1102) and make custom amendments, resulting in Version B 1106 (also known as Customer Version).

It is virtually impossible to reconcile changes between Version A 1104 and Version B 1106 by doing 2-way compare, for the reasons described above. A direct comparison of Version A 1104 directly with Version B 1106 will be time-consuming, complex and error-prone. However, when the two versions (Version A 1104 and Version B 1106) share Common Ancestor 1102, then performing a 3-way, schema-aware compare easily identifies who made which changes and which changes are a potential conflict. The 3-way compare is outlined in FIG. 11B, in which Common Ancestor 1102 is compared with Version A 1104 (comparison 1108), and Common Ancestor 1102 is also compared with Version B 1106 (comparison 1110). The difference between the 2-way schema aware comparison 1108 and the 2-way schema aware comparison 1110, provides a way to compare the differences between Version A 1104 and Version B 1106.

In summary, a 3-way schema-aware compare still uses a schema-aware comparison of two resources A and B. However, adding a common ancestor allows the schema-aware compare tool to identify the source of the changes. A common ancestor (i.e. master copy) is obtained from a repository. Tracking the ancestry through 'data crumbs' can make that process fully automatic and very reliable. In addition, potential conflicts are easy to spot and with a schema-aware compare of nested properties, potential conflicts can be resolved with manual intervention. Other changes can simply be approved or rejected. Capturing approve/reject decisions can persist these decisions and retain or use them in future reports.

Figure 12:
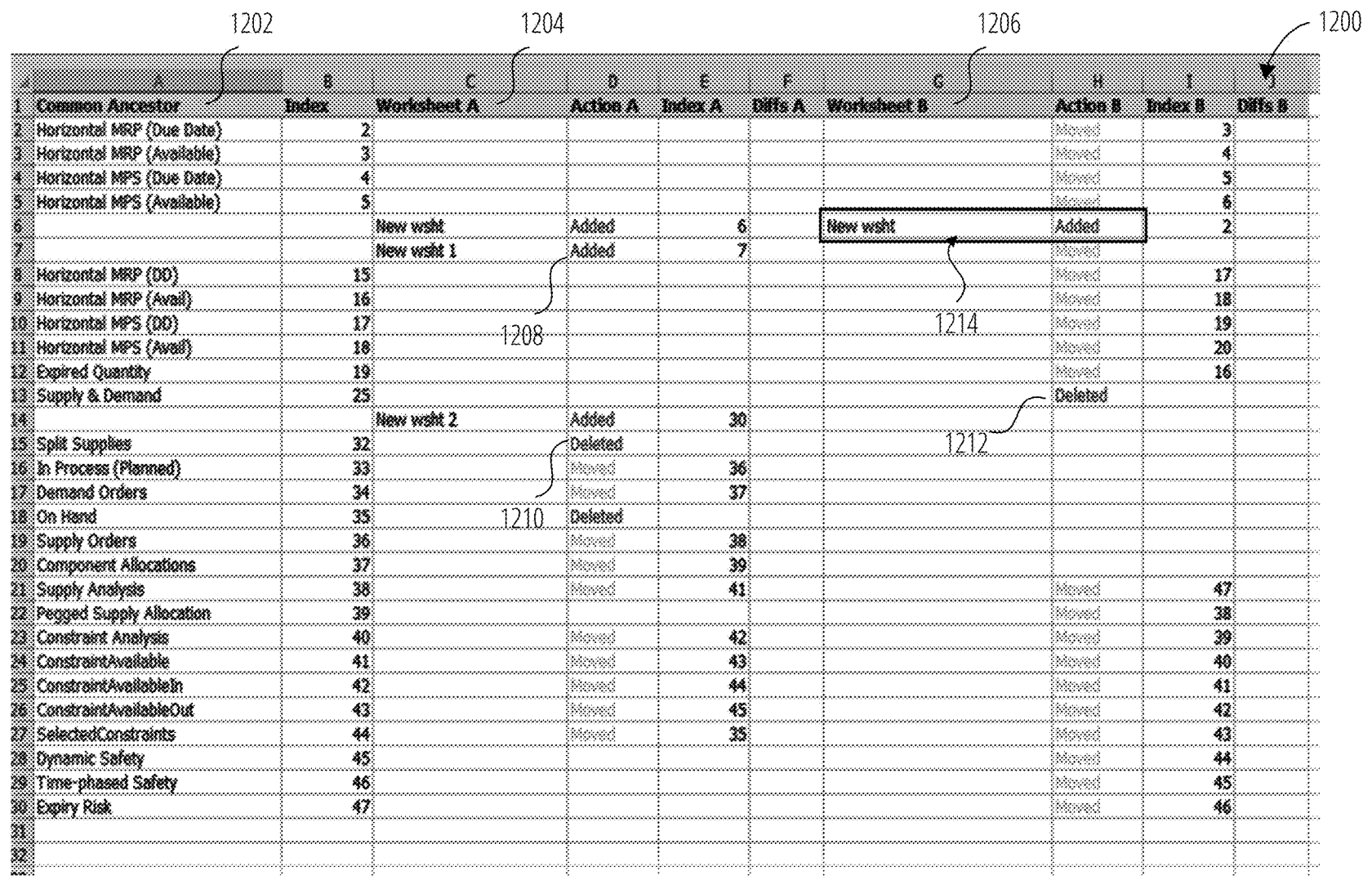

FIG. 12 illustrates an example of a 3-way compare report 1200 in accordance with one embodiment. In FIG. 12, a resource workbook is amended by two different actors.

The compare report 1200 illustrates changes at the worksheet level. The full compare report 1200 also contains workbook/worksheet/column properties (not shown). The common ancestor 1202 is listed in column A, while version A 1204 is shown in column C, and version B 1206 is shown in column G. Changes made in version A 1204 (compared to common ancestor 1202) are listed in column D. For example, an addition 1208 and a deletion 1210 were made.

Similarly, changes made in version B 1206 (compared to common ancestor 1202) are listed in column H. For example, deletion 1212 was made.

The compare report 1200 allows for a quick analysis of potential conflicts between version A 1204 and version B 1206. For example, both version A 1204 and version B 1206 indicate an addition of a new worksheet at row 6—thereby identifying a potential conflict 1214 between the two versions. This quick analysis is due to the 3-way compare (comparing version A 1204 with common ancestor 1202; comparing version B 1206 with common ancestor 1202; and then reconciling the two sets of the differences).

In summary, an effective, easy-to-use comparison tool includes: a schema-aware compare; sophisticated handling of collection properties, especially nested collections; effective matching algorithms to recognize that two items are the same business object in spite of outward differences; an ability to accept user hints and input and persist user decisions; a structured report that reflects the structure of the business object; color formatting, tagging, and filtering to find the important changes among the large volume of differences (among the thousands of changes per resource). Furthermore, adding common ancestor as a third data point identifies the source of changes.

Application to Semi-Structured or Unstructured Components

The systems and methods disclosed herein can employ parsing and comparison techniques of freeform text, which extends the capability to monitor changes, associate the changes with a business purpose, and construct a customized solution specific to a customer from a master copy that includes semi-structured or unstructured components, such as programs, code, expressions, macros, embedded documentation, user documentation, test plans, training materials, test data, solution packaging, installation, etc.

Figure 13:
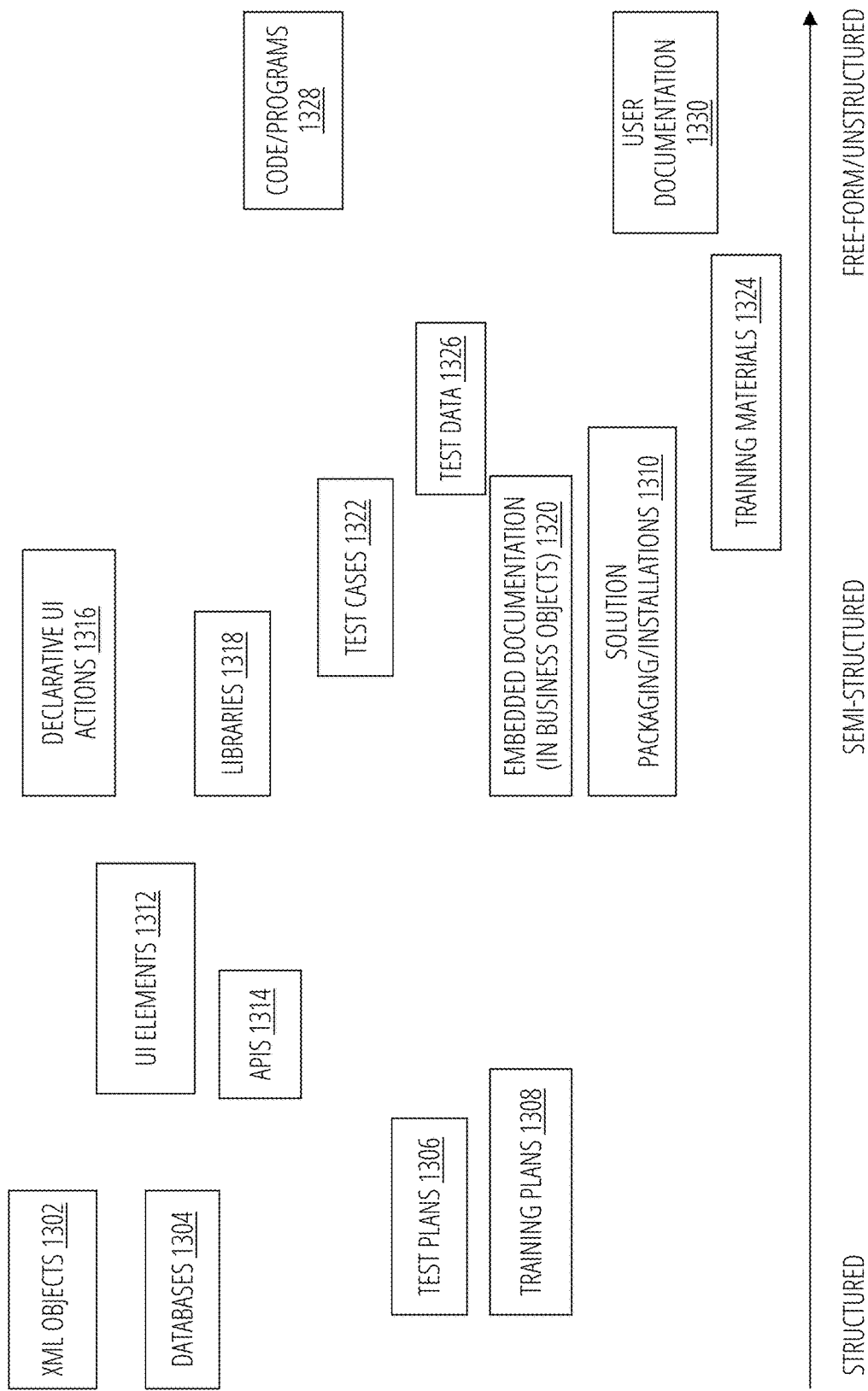
FIG. 13 illustrates examples of different types of components in accordance with one embodiment.

FIG. 13 illustrates examples of a continuum of solution components/elements of varying degree of structure that can be addressed by the disclosed systems and methods. The continuum includes different types of components—from structured resources, to semi-structured components to unstructured or free-form components, such as code/programs 138 and/or user documentation 1330. While structured elements dominate low-code solutions, the systems and methods disclosed herein apply to all cases. As the elements become less structured, the likelihood of merge conflicts or errors increases. However, one still achieves a significant cost reduction in delivering customized solutions.

Examples of structured components include XML objects 1302, databases 1304, test plans 1306, training plans 1308, UI elements 1312 and APIs 1314. XML objects are structured, enforced by XML schemas. Furthermore, databases are structured, enforced by Database schema and relational integrity rules. UI elements are structured, usually represented as XML. Test plans are structured (often stored as XML or in tabular spreadsheet or tree-like format).

Examples of semi-structured components include declarative UI actions 1316, libraries 1318 embedded documentation (in business objects) 1320, test cases 1322, training materials 1324 and test data 1326. UI behaviour (i.e. 1316) is semi-structured but is governed by design patterns such as Model-View-Controller. Model represents the data entities, view describes the UI elements, and Controller describes the UI behavior either declaratively (XML, property sheets) or freeform (code that implement various UI actions). Of these three, the first two (i.e. Model and Controller) are structured, and the code is still governed by the grammar of the programming language. Comparing and merging code is a well-known process with tools for support, such as GIT. In addition, tests are semi-structured, as is test data 1326. In addition, process documentation is semi-structured; as is packaging, deployment. and Installation (1310).

Generating Test Plans for Customized Solutions

Testing activities may account for up to 50% of the total development cost of a customized solution. One of the benefits of the proposed system to analyze and catalog all known customizations of a complex business system, is its ability to also track existing test plans, and test plan modifications applied during the development of the customized solution. The system can further reduce the cost of creating and maintaining a customized business solution by generating a customized test plan that considers the master solution copy, all applicable manual and automated test cases, an effective solution recipe, dependencies between resources, process steps, and test cases.

Generating Documentation and Training Materials for Customized Solutions

Every customized solution is provided with accompanying documentation and training materials. Creating and maintaining these materials may consume a significant percentage of the total development cost of a customized solution. One of the benefits of the disclosed systems and methods to analyze and catalog all known customizations of a complex business system, is the ability to also track embedded or stand-alone documentation, track changes to the documentation, analyze patterns in the free-form text contained in solution documentation and annotate these changes. The system can further reduce the cost of creating and maintaining a customized business solution by generating a customized documentation and training set that considers the master solution copy, all applicable embedded or standalone documentation and training materials, an effective solution recipe, dependencies between resources, process steps, and test cases. Advanced text comparison algorithms and machine-learning algorithms may be used to provide robust tools for handling free-form text contained in the solution documentation and training materials.

Parsing Changes to the Code Contained in an LCP

An LCP solution aims to substitute configuration for developing computer code, but all LCP platforms contain a certain percentage of freeform code in their implementation. Unlike documentation, this code is subject to strict rules associated with the computer language being employed and is very difficult to programmatically modify. The systems and methods disclosed herein employ deep knowledge of the programming language grammar to provide robust tools to track, compare, annotate, and modify code contained in the resources. The idea is similar to schema-aware compare described above but instead of leveraging metadata such an XML schema to handle a structured business object such as workbook, the expression handling leverages language grammar of the computer language employed in a given embodiment to convert free-form code to a structured object tree and gain deep insight into the structure of the code.

In some embodiments, the language grammar may be captured using a parser generator for reading, processing executing or translating structured text or binary files. ANTLR (Another Tool for Language Recognition) is an example of such a generator that builds languages, tools, and frameworks. From a grammar, ANTLR generates a parser that can build and walk parse trees.

In some embodiments, the language grammar may be captured using as an ANTLR grammar and used by the language parser and interpreter to validate and execute code contained in the LCP. In other cases, solutions use standardized languages, such as SQL or JavaScript, with known grammar. Such tools produce an object tree from a freeform code written by a developer or consultant. The object tree can be handled using the same methodology as described in schema-aware compare to gain detailed understanding of changes made to the code, their business purpose, annotation, and automated generation of custom resources. The tools can also use the language grammar to validate expressions they process and alert users of potential errors.

In summary, extending the reach of the disclosed systems and methods for automated generation of customized resources to include the freeform code aims to further reduce the cost of customizing solutions for each customer's unique needs.

Figure 14:
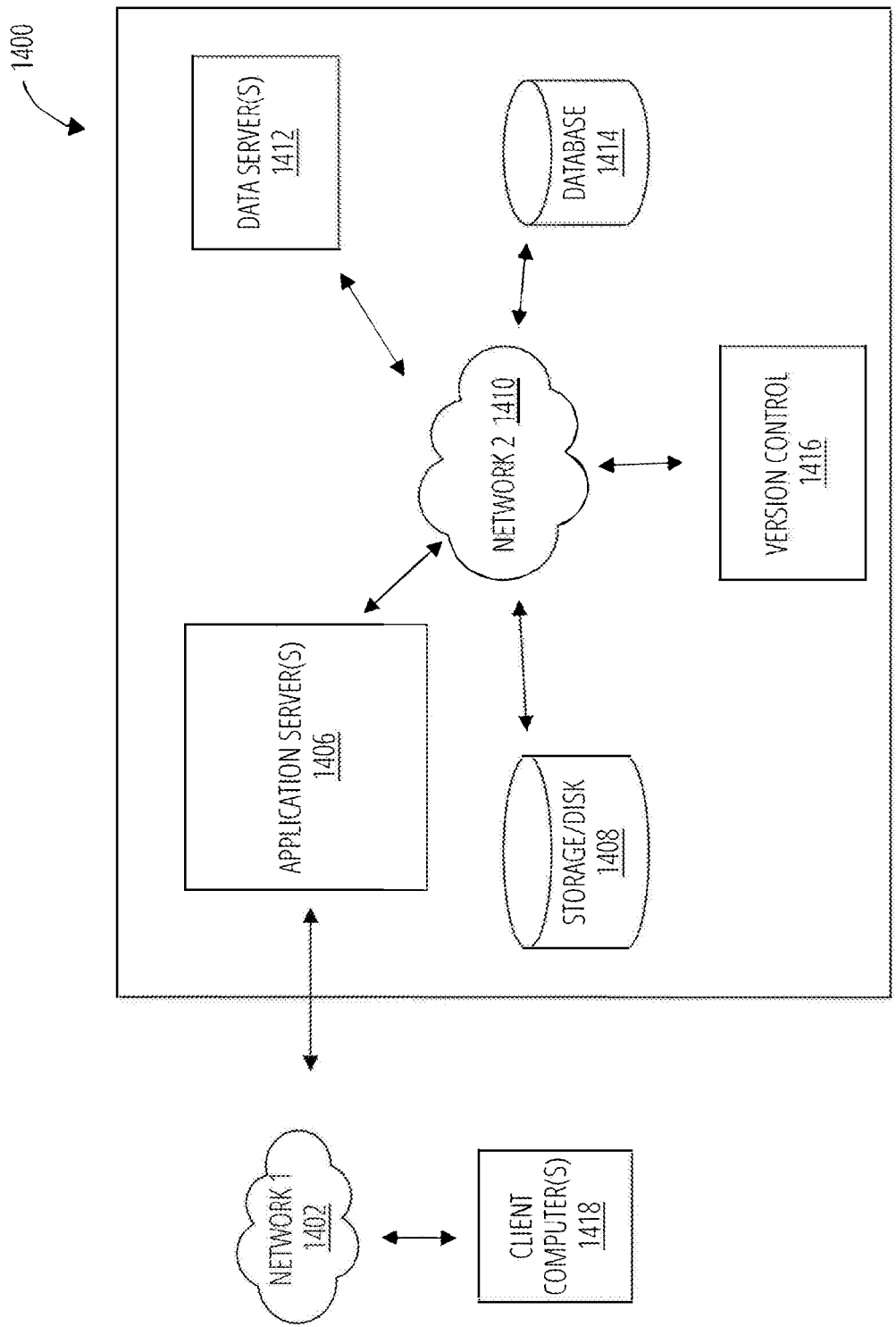
FIG. 14 illustrates a block diagram of a system in accordance with one embodiment.

FIG. 14 illustrates a block diagram of system 1400 in accordance with one embodiment.

System 1400 comprises one or more client computer(s) 1418, a first network (network 1 1402), one or more application server(s) 1406, a second network (network 2 1410), one or more data server(s) 1412, a database 1414, storage/disk 1408, and a version control 1416. The servers may be co-located and use a local network, or can be hosted in multiple data centers or a public cloud.

Client computer(s) 1418, among other functions, may run a user interface. Client computer(s) 1418 can include a mobile device, and may comprise a central processing unit (CPU), a disk and a volatile memory. In some embodiments, client computer(s) 1418 communicate with application server(s) 1406 via network 1 1402.

Application server(s) 1406, among other functions, may run business logic for the system. Application server(s) 1406 may comprise a central processing unit (CPU), a disk and a volatile memory. There may be many application servers communicating with each other or performing specialized tasks.

Version control 1416, among other functions, can manage multiple versions of business objects. Version control 1416 may comprise a central processing unit (CPU), a disk and a volatile memory.

Data server(s) 1412, among other functions, can: perform back-end processing, run various algorithms, manage database access, etc.

In some embodiments, network 2 1410 serves as a hub for communication between application server(s) 1406, data server(s) 1412, storage/disk 1408, database 1414 and version control 1416.

System 1400 can also include additional features and/or functionality. For example, system 1400 can also include additional storage (removable and/or non-removable) including, but not limited to, magnetic or optical disks or tape. Such additional storage is illustrated in FIG. 14 by storage/disk 1408. Storage media can include volatile and nonvolatile, removable and non-removable media implemented in any method or technology for storage of information such as computer-readable instructions, data structures, program modules or other data. Storage/disk 1408 is an example of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 1400. Any such non-transitory computer-readable storage media can be part of system 1400.

Communication between client computer(s) 1418, application server(s) 1406, data server(s) 1412, storage/disk 1408, database 1414 and version control 1416 can be over various network types. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). Generally, communication between various components of system 1400 may take place over hard-wired, cellular, Wi-Fi or Bluetooth networked components or the like. In some embodiments, one or more electronic devices of system 1400 may include cloud-based features, such as cloud-based memory storage.

Although the algorithms described above including those with reference to the foregoing flow charts have been described separately, it should be understood that any two or more of the algorithms disclosed herein can be combined in any combination. Any of the methods, modules, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner and can be used separately or in combination.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   generating, by a processor, an effective recipe file by selecting at least one of a functionality, a feature and a configuration option from a master recipe database, the selecting based on a business objective; and
   generating, by the processor, a customized resource by applying the effective recipe file to a first working copy of a resource selected from a master copy of resources;
   wherein the master recipe database is generated by:
      annotating, by the processor, a list of modifications in a recipe file, thereby producing an annotated list of modifications;
      merging, by the processor, the annotated list of modifications into the master recipe database, the master recipe database containing a catalogue of generated modifications; and
      verifying, by the processor, the master recipe database to ensure there are no conflicts or inconsistencies with respect to other annotated lists of modifications in the master recipe database;
   wherein the recipe file is a compilation of one or more recipe file items, and wherein each recipe file item is generated by:
      creating, by the processor, a working copy of a first resource selected from the master copy of resources;
      editing, by the processor, the working copy of the first resource, thereby generating a second resource;
      testing, by the processor, one or more use cases having expected inputs and outputs for validating the second resource;
      comparing, by the processor, the working copy of the first resource with the second resource;
      generating, by the processor, a recipe file item from one or more differences between the working copy of the first resource and the second resource, the recipe file item comprising tags that form a menu of configuration options that transform the working copy of the first resource to the second resource;
      applying, by the processor, the recipe file item to the working copy of the first resource, thereby generating a third resource;
      comparing, by the processor, the third resource with the second resource; and
      validating, by the processor, the recipe file item.

2. The computer-implemented method of claim 1, wherein comparing between any two resources is a schema-aware compare.

3. The computer-implemented method of claim 2, wherein comparing between any two resources compares schema metadata of the first resource and the second resource.

4. The computer-implemented method of claim 1, wherein the master copy is documented and tested; and includes a plurality of functionalities, a plurality of features, and a plurality of configuration options.

5. The computer-implemented method of claim 1, wherein the resources comprise at least one of workbooks, widgets, task flows, scripts, scorecards, responsibility, process templates, hierarchies, forms, filters, dashboards and alerts.

6. A system comprising:
   a processor; and
   a memory storing instructions that, when executed by the processor, configure the system to:
      generate, by the processor, an effective recipe file by selecting at least one of a functionality, a feature and a configuration option from a master recipe database, the selecting based on a business objective; and
      generate, by the processor, a customized resource by applying the effective recipe file to a first working copy of a resource selected from a master copy of resources;
   wherein the master recipe database is generated by the memory storing instructions that, when executed by the processor, further configure the system to:
      annotate, by the processor, a list of modifications in a recipe file, thereby producing an annotated list of modifications;
      merge, by the processor, the annotated list of modifications into the master recipe database, the master recipe database containing a catalogue of generated modifications; and
      verify, by the processor, the master recipe database to ensure there are no conflicts or inconsistencies with respect to other annotated lists of modifications in the master recipe database;
   wherein the recipe file is a compilation of one or more recipe file items, and wherein each recipe file item is generated by the memory storing instructions that, when executed by the processor, further configure the system to:
      create, by the processor, a working copy of a first resource selected from the master copy of resources;
      edit, by the processor, the working copy of the first resource, thereby generating a second resource;
      test, by the processor, one or more use cases having expected inputs and outputs for validating the second resource;
      compare, by the processor, the working copy of the first resource with the second resource;
      generate, by the processor, a recipe file item from one or more differences between the working copy of the first resource and the second resource, the recipe file item comprising tags that form a menu of configuration options that transform the working copy of the first resource to the second resource;

apply, by the processor, the recipe file item to the working copy of the first resource, thereby generating a third resource;

compare, by the processor, the third resource with the second resource; and validate, by the processor, the recipe file item.

7. The system of claim 6, wherein comparing between any two resources is a schema-aware compare.

8. The system of claim 7, wherein comparing between any two resources compares schema metadata of the first resource and the second resource.

9. The system of claim 6, wherein the master copy is documented and tested; and includes a plurality of functionalities, a plurality of features, and a plurality of configuration options.

10. The system of claim 6, wherein the resources comprise at least one of workbooks, widgets, task flows, scripts, scorecards, responsibility, process templates, hierarchies, forms, filters, dashboards and alerts.

11. A non-transitory computer-readable storage medium, the computer-readable storage medium including instructions that when executed by a computer, cause the computer to:

generate, by a processor, an effective recipe file by selecting at least one of a functionality, a feature and a configuration option from a master recipe database, the selecting based on a business objective; and generate, by the processor, a customized resource by applying the effective recipe file to a first working copy of a resource selected from a master copy of resources;

wherein the master recipe database is generated by the instructions that when executed by the computer, cause the computer to:

annotate, by the processor, a list of modifications in a recipe file, thereby producing an annotated list of modifications;

merge, by the processor, the annotated list of modifications into the master recipe database, the master recipe database containing a catalogue of generated modifications; and verify, by the processor, the master recipe database to ensure there are no conflicts or inconsistencies with respect to other annotated lists of modifications in the master recipe database;

wherein the recipe file is a compilation of one or more recipe file items, and wherein each recipe file item is generated by the instructions that when executed by the computer, cause the computer to:

create, by the processor, a working copy of a first resource selected from the master copy of resources;

edit, by the processor, the working copy of the first resource, thereby generating a second resource;

test, by the processor, one or more use cases having expected inputs and outputs for validating the second resource;

compare, by the processor, the working copy of the first resource with the second resource;

generate, by the processor, a recipe file item from one or more differences between the working copy of the first resource and the second resource, the recipe file item comprising tags that form a menu of configuration options that transform the working copy of the first resource to the second resource;

apply, by the processor, the recipe file item to the working copy of the first resource, thereby generating a third resource;

compare, by the processor, the third resource with the second resource; and validate, by the processor, the recipe file item.

12. The computer-readable storage medium of claim 11, wherein comparing between any two resources is a schema-aware compare.

13. The computer-readable storage medium of claim 12, wherein comparing between any two resources compares schema metadata of the first resource and the second resource.

14. The computer-readable storage medium of claim 11, wherein the master copy is documented and tested; and includes a plurality of functionalities, a plurality of features, and a plurality of configuration options.

15. The computer-readable storage medium of claim 11, wherein the resources comprise at least one of workbooks, widgets, task flows, scripts, scorecards, responsibility, process templates, hierarchies, forms, filters, dashboards and alerts.

* * * * *